United States Patent [19]

Lauro

[11] 3,779,129

[45] Dec. 18, 1973

[54] ELECTRICAL MONITORING AND MANAGEMENT SYSTEM FOR AIRBORNE ORDNANCE

[76] Inventor: Michael J. Lauro, Belle Vale St., Monroe, Conn. 06468

[22] Filed: Mar. 3, 1970

[21] Appl. No.: 16,200

Related U.S. Application Data

[63] Continuation of Ser. No. 535,482, March 18, 1966, abandoned.

[52] U.S. Cl. ........... 89/1.5 R, 89/1.8 R, 89/1.814 R

[51] Int. Cl. ........... F41f 5/00, F41f 5/02, F41f 3/04

[58] Field of Search .................... 340/147 A, 162 R; 89/1.5 R

[56] References Cited

UNITED STATES PATENTS

| | | | |
|---|---|---|---|
| 3,499,363 | 3/1970 | Lauro | 89/1.5 |
| 2,901,728 | 8/1959 | Breese | 340/163 |
| 3,030,015 | 4/1962 | Weislander | 340/147 A |
| 3,349,374 | 10/1967 | Gabrielson | 340/163 |

*Primary Examiner*—Harold I. Pitts
*Attorney*—De Lio and Montgomery

[57] ABSTRACT

This disclosure relates to a system for controlling the actuation of different types of stores at various remote store stations where each store requires management in one or more operational modes prior to actuation. The type of store at each station is sensed and the store type is visually displayed at a central location. When the operator selects a store type for actuation other display means responsive to selection means and the sensing means display the operational modes of the selected store that require management prior to actuation thereof. Further display means responsive to the mode selection display to the operator the options available in each management mode. When the operator has made compatible selections in all mode options he may then actuate the selected store type.

19 Claims, 20 Drawing Figures

PATENTED DEC 18 1973 3,779,129

SHEET 01 OF 15

INVENTOR

Michael J. Lauro

BY

Dedio and Montgomery

ATTORNEYS

INVENTOR
Michael J. Lauro
BY
DeLio and Montgomery
ATTORNEYS

INVENTOR

Michael J. Lauro

BY

DeLio and Montgomery

ATTORNEYS

INVENTOR
Michael J. Lauro
BY
DeLio and Montgomery
ATTORNEYS

INVENTOR
Michael J. Lauro

BY
DeLio and Montgomery
ATTORNEYS

INVENTOR
Michael J. Lauro

BY DeLio and Montgomery
ATTORNEYS

INVENTOR
Michael J. Lauro

BY DeLio and Montgomery
ATTORNEYS

INVENTOR
Michael J Lauro

BY
DeLio and Montgomery
ATTORNEYS

INVENTOR

Michael J. Lauro

BY

Dedio and Montgomery
ATTORNEYS

PATENTED DEC 18 1973 3,779,129

SHEET 10 OF 15

INVENTOR

Michael J. Lauro

BY

Dedio and Montgomery

ATTORNEYS

INVENTOR
Michael J. Lauro

BY Dedio and Montgomery
ATTORNEYS

INVENTOR
Michael J. Lauro

BY Dedco and Montgomery
ATTORNEYS

INVENTOR
Michael J. Lauro

BY Dedio and Montgomery
ATTORNEYS

INVENTOR
Michael J. Lauro
BY
DeLio and Montgomery
ATTORNEYS

INVENTOR
Michael J. Lauro

BY DeLio and Montgomery
ATTORNEYS

ELECTRICAL MONITORING AND MANAGEMENT SYSTEM FOR AIRBORNE ORDNANCE

This application is a continuation of copending application Ser. No. 535,482, filed Mar. 18, 1966, now abandoned.

This invention relates to a system for monitoring and managing the conditions of selected devices at a plurality of locations, and more particularly relates to a system for managing from a central point a plurality of devices at remote locations which require correlative management in at least one of a plurality of possible modes to achieve a desired result.

This invention provides a new and improved control system which permits or prohibits simultaneous management of a plurality of device dependent on the compatibility of such devices through at least one of a plurality of applicable management modes, each mode requiring one or more option selections to complete a management cycle. The invention further utilizes display means programmed in a new and improved manner to indicate to the operator the devices to be managed, the modes applicable to each device that must be managed and options in each mode.

A management system embodying the invention may be utilized to great advantage in the management of a plurality of store systems including weapons systems and, accordingly, one form of the invention will be disclosed in such environment. At the present time, the operator of a weapons or counter measure carrying aircraft may be presented with a mission which requires the carrying and release of diverse weapons, such as missiles of various types, bombs, automatic projectile firing weapons, etc. Thus, the operator of such aircraft, besides piloting and navigating the aircraft, is faced with the problem of remembering what particular weapons he is carrying, the amount of such weapons, the options he has for releasing various types of weapons, the quantity of weapons to be released in a given pass at a target and, in some cases, the rate of release.

In a complex apparatus such as modern day aircraft which essentially may be considered as sophisticated weapons platforms carrying a plurality of diverse stores, the importance that must be placed on operator control simplicity increases as the stores being controlled and their modes of control become more complex. To assure proper system operation, the control elements that can introduce human error must be reduced to a minimum or eliminated. An ideal situation would be to replace the human element in this system by automated means. However, in the case of systems for the control and monitoring of weapons for military aircraft, this is not practical. The operator's decision-making problems cannot be predicted in advance of an air-borne mission since control procedures vary with the types of weapons and stores being carried, conditions at the target site, and the mode of delivery elected for use by the operator.

In addition to the human factor consideration, control systems must facilitate the operation of a complex of multiple devices. It must have the inherent ability to provide control for new devices as they become available. The component arrangement must also consider the environment where the control system must be installed, operated and maintained.

Accordingly, this invention provides a control system that is usable for aircraft or any other application where decision-making without error and control versatility is of prime importance.

In one form thereof, this invention provides a new and improved display and logic system which monitors the existence of particular stores mounted to the aircraft and which allows the operator to have a presentation of the particular type of stores carried on the plane, together with correlation of presentations, control of the modes of operation of such stores, and control option selections. The invention further provides new and improved logic techniques to correlate a selected store type with display of delivery modes and control options within each mode, for each particular store type to permit a high degree of flexibility. Further logic means are provided to quickly display intelligence to the operator in a checklist type fashion such that upon selection of a store type for release only applicable options to that store type are displayed for mode of delivery, off-loading procedure, rate of delivery, etc. to greatly diminish the possiblity of operator error. This feature, in essence, eliminates the possiblity of the operator forgetting what option choices must be made to completely set up a weapons system for operation and, therefore, assures that the operator will take all necessary steps to deliver a particular weapons system.

The invention further includes memory units to memorize selected options, to allow rapid system setup and bring the stores to a set condition for actuation, and thus eliminate the possibility of the operator forgetting or failing to take all necessary steps to delivery and release selected weapons when the target is reached. The invention further includes new and improved logic means for correlating weapons delivery modes with store mode options which preclude operator selection of an incorrect delivery mode for the type of weapon installed as, for example, precludes the operator from selecting a dive delivery of an air burst bomb.

The invention further permits a basic class of stores, such as bombs, to be individually selected according to the exact type of bomb in order to display applicable options for each type. The provision of these features is accomplished with a relatively small unit which occupies but little space in the aircraft cockpit and on the instrument panel and which utilizes existing aircraft wiring to existing weapons-carrying stations.

Accordingly, an object of this invention is to provide a new and improved management system to manage a plurality of devices at a plurality of locations from a central point.

Another object of this invention is to provide a new and improved management system whih correlates in a new and improved manner intelligence relating to the type of devices at a plurality of remote locations, applicable modes of management of such devices to obtain actuation thereof, options of control available in each management mode and present such correlation in such a manner as to minimize or eliminate the possibility of error in management of the devices.

Another object of this invention is to provide a new and improved system of the type described which is adaptable to receive a plurality of diverse stores and which may accept stores developed in the future with very little modification.

Another object of this invention is to provide a new and improved system of the type described which memorizes all selected options in a management cycle and permits recall and continuous monitoring of selected options.

Another object of this invention is to provide a new and improved system of the type described utilizing interchangeable circuit elements which are or may be programmed in accordance with the type of stores to be mounted to each store station and sense the compatibility or incompatibility of the stores mounted to said stations.

A further object of this invention is to provide a new and improved stores management system having a high degree of reliability and which greatly facilitates the decision making of the operator.

A still further object of the invention is to provide a new and improved system of the type described which permits selection of only compatible stores for simultaneous actuation and in response to selection of such stores indicating the management modes required to actuate the selected stores.

A still further object of this invention is to provide a new and improved electrical management system for managing a plurality of remote stations and devices thereat from an integrated control network having selection means for controlling logical management of all of the stations, and further including a packaged circuit associated with each station, including operative means for sensing one or more types of devices at its associated station and in response to such sensing programming the integrated control network in accordance with the sensed stores, together with a new and improved arrangement at the integrated control for selecting one or more stores for management, each of the sensing means being responsive to selection of the device at its associated station for inhibiting selection by the integrated control means of another device having different management requirements than the selected device.

A still further object of this invention is to provide a new and improved display apparatus for monitoring and managing a plurality of management modes and options therein which must be selected for completion of a management cycle.

Other objects of the invention will in part be apparent and in part be pointed out in the following detailed description of one embodiment of the invention.

The features of the invention which are believed to be novel are particularly pointed out and distinctly claimed in the concluding portion of this specification. However, the invention both as to its organization and operation and together with further objects and advantages thereof may best be appreciated by reference to the following detailed description taken in conjunction with the drawings, in which:

FIG. 1 is a diagram, partly in block form and partly diagrammatic, functionally illustrating an overall system embodying the invention and a display panel used in conjunction therewith;

FIG. 2 in a drawing in perspective, and partly cut away, illustrating a preferred type of display module used in the panel of FIG. 1;

FIGs. 3*a*, 3*b* and 3*c* are drawings representative of the displays which may be set forth in the grouped display modules of FIG. 1;

Figure 1:
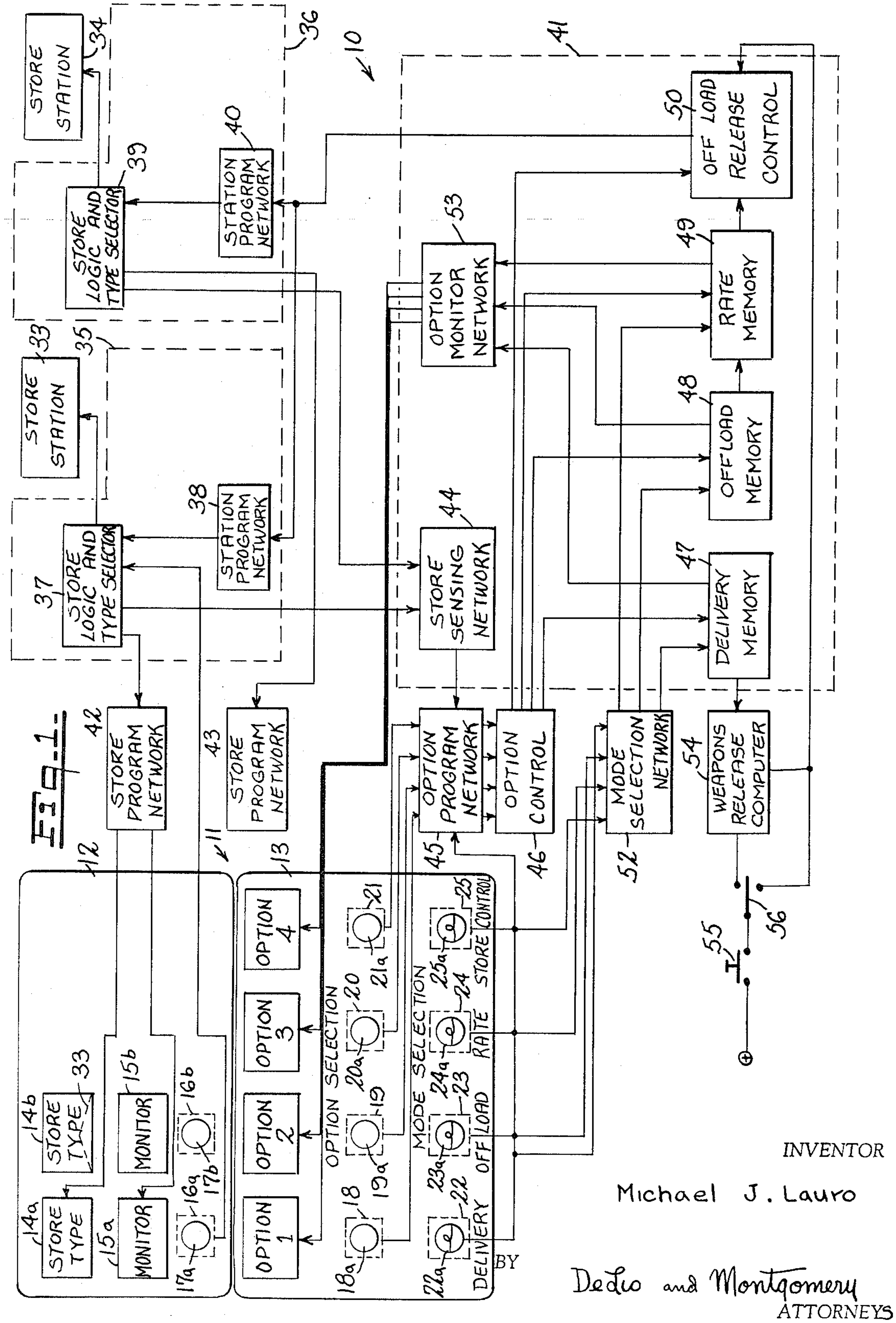
Figure 6A:
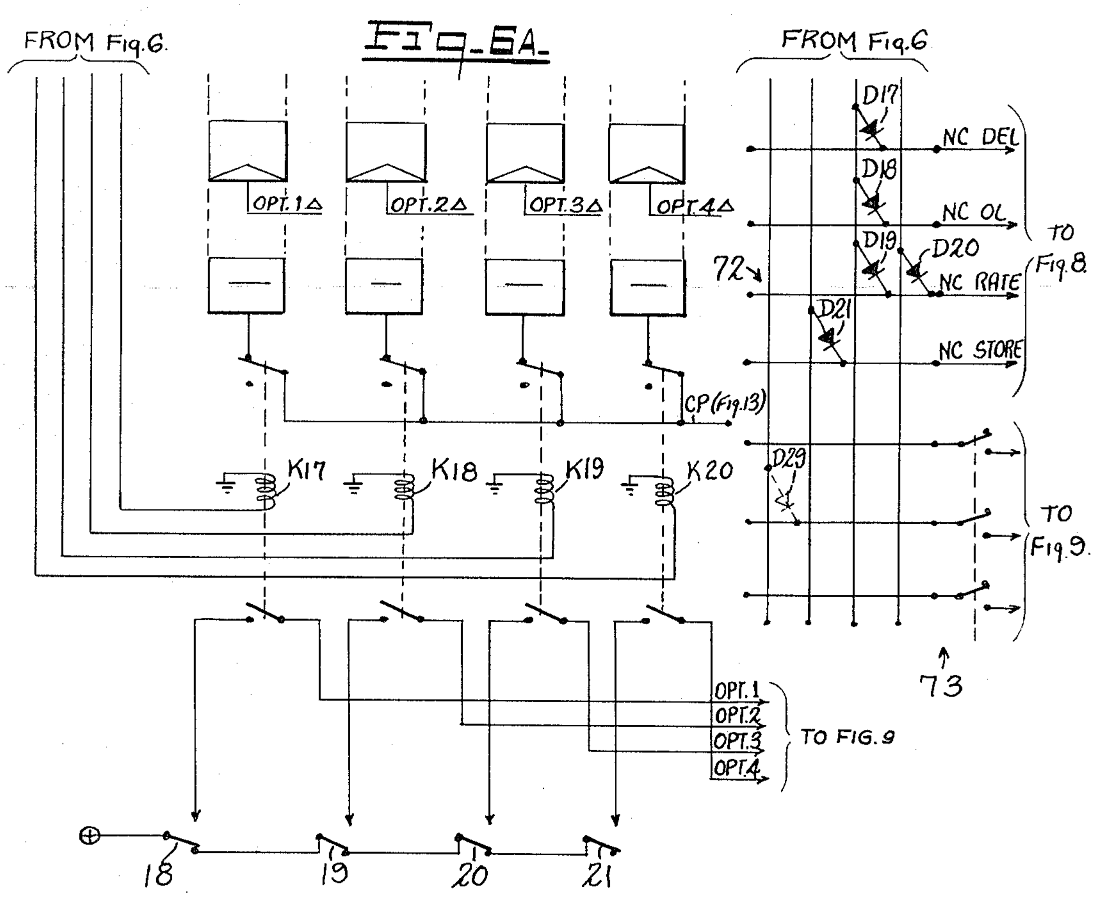
Figure 6:
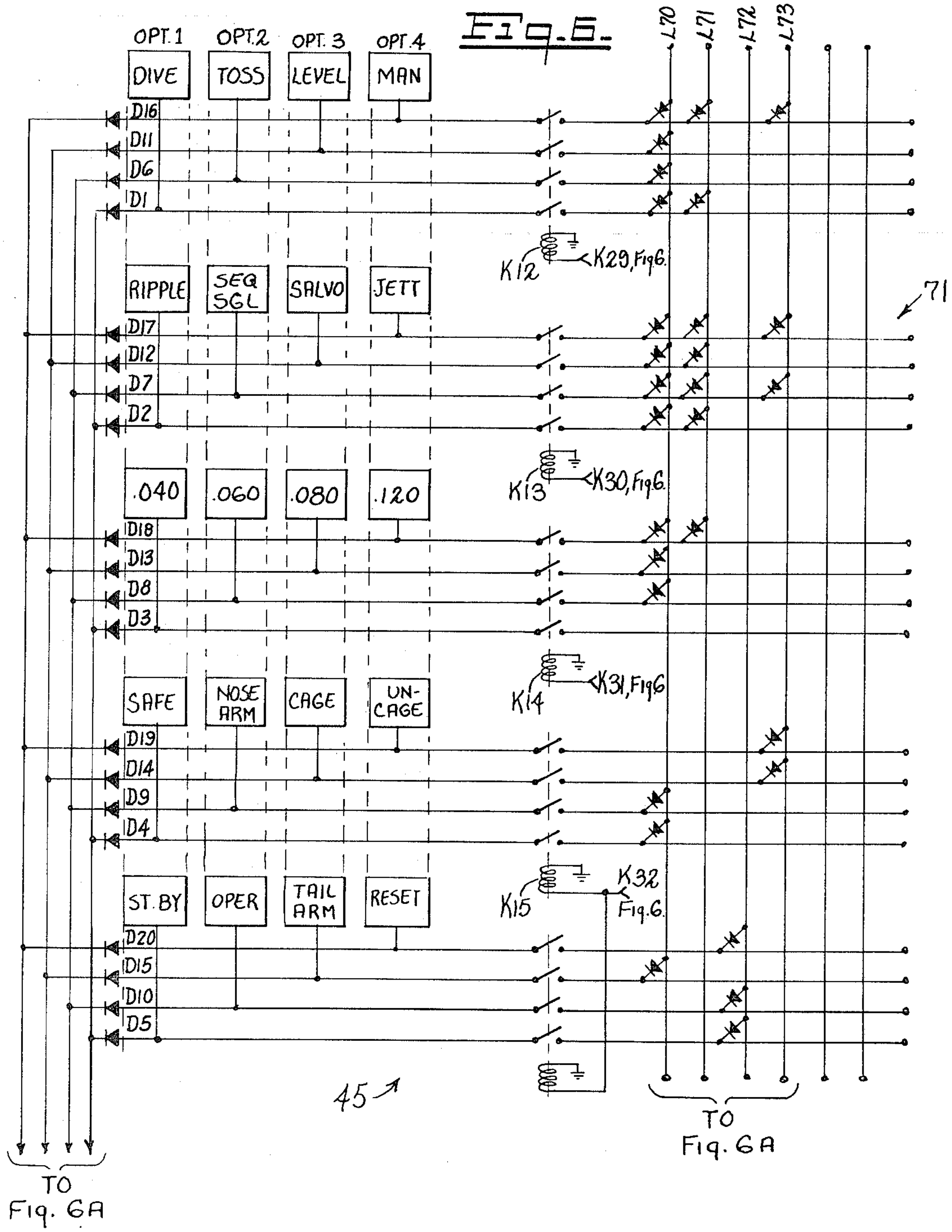
Figure 7:
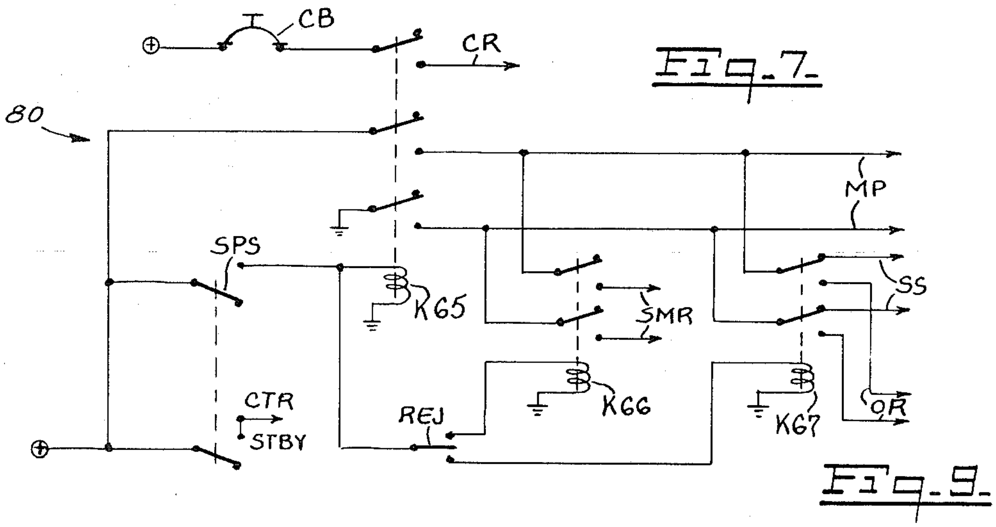
Figure 9:
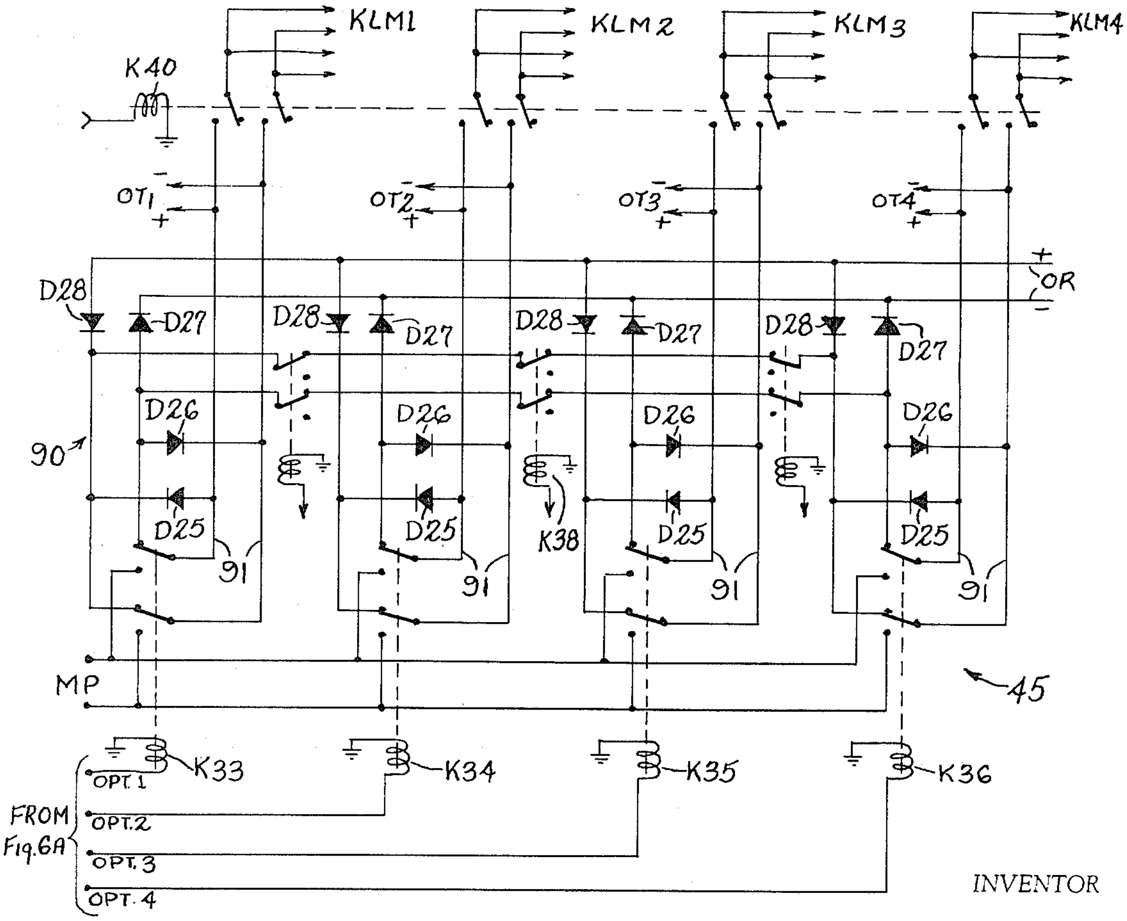
Figure 8:
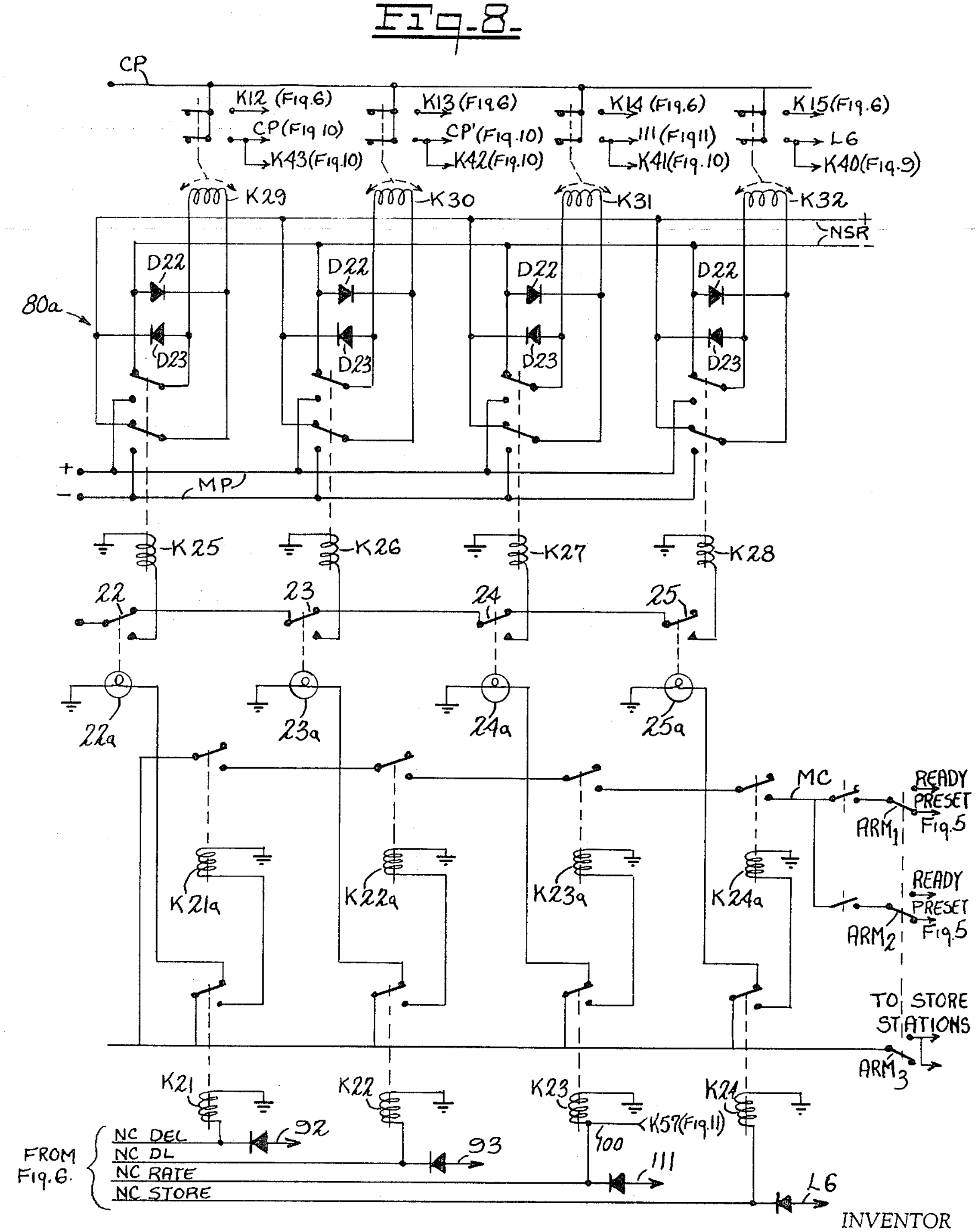

FIGS. 6 and 6*a* are schematic diagrams of the option program network of FIG. 1 showing the correlation of this network with the option selection, mode selection and store sensing networks;

FIG. 7 is a schematic of a system power circuit;

FIG. 8 is a schematic diagram of the mode selection network of FIG. 1 and its relation to the panel mode selection means and option memories;

FIG. 9 is a schematic diagram of the option control network of FIG. 1 and further showing its relation to the option program network of FIGS. 6 and 6*a;*

Figure 4:
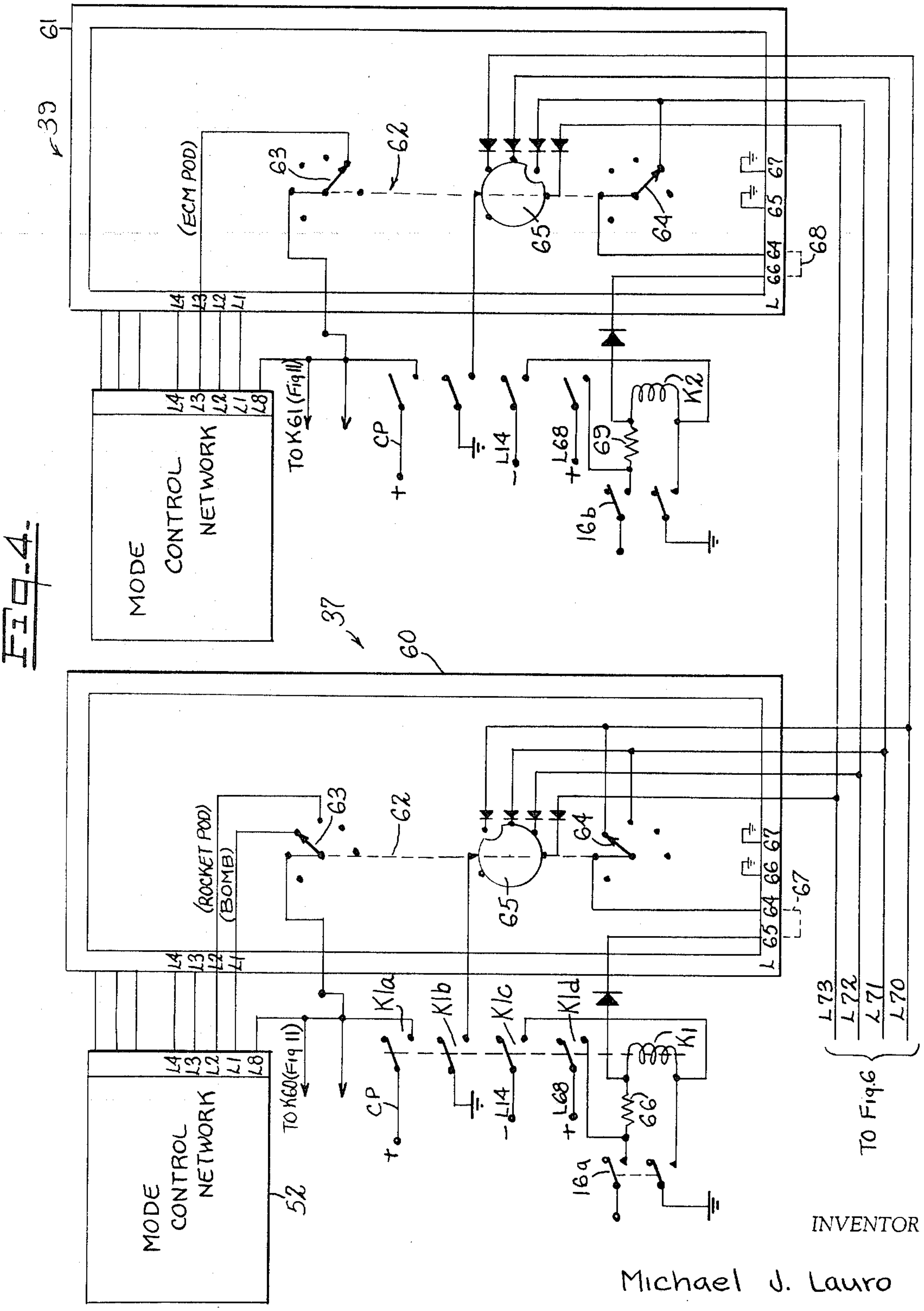
FIG. 4 is a schematic diagram of pre-programmed logic means associated with each store station.
Figure 10:
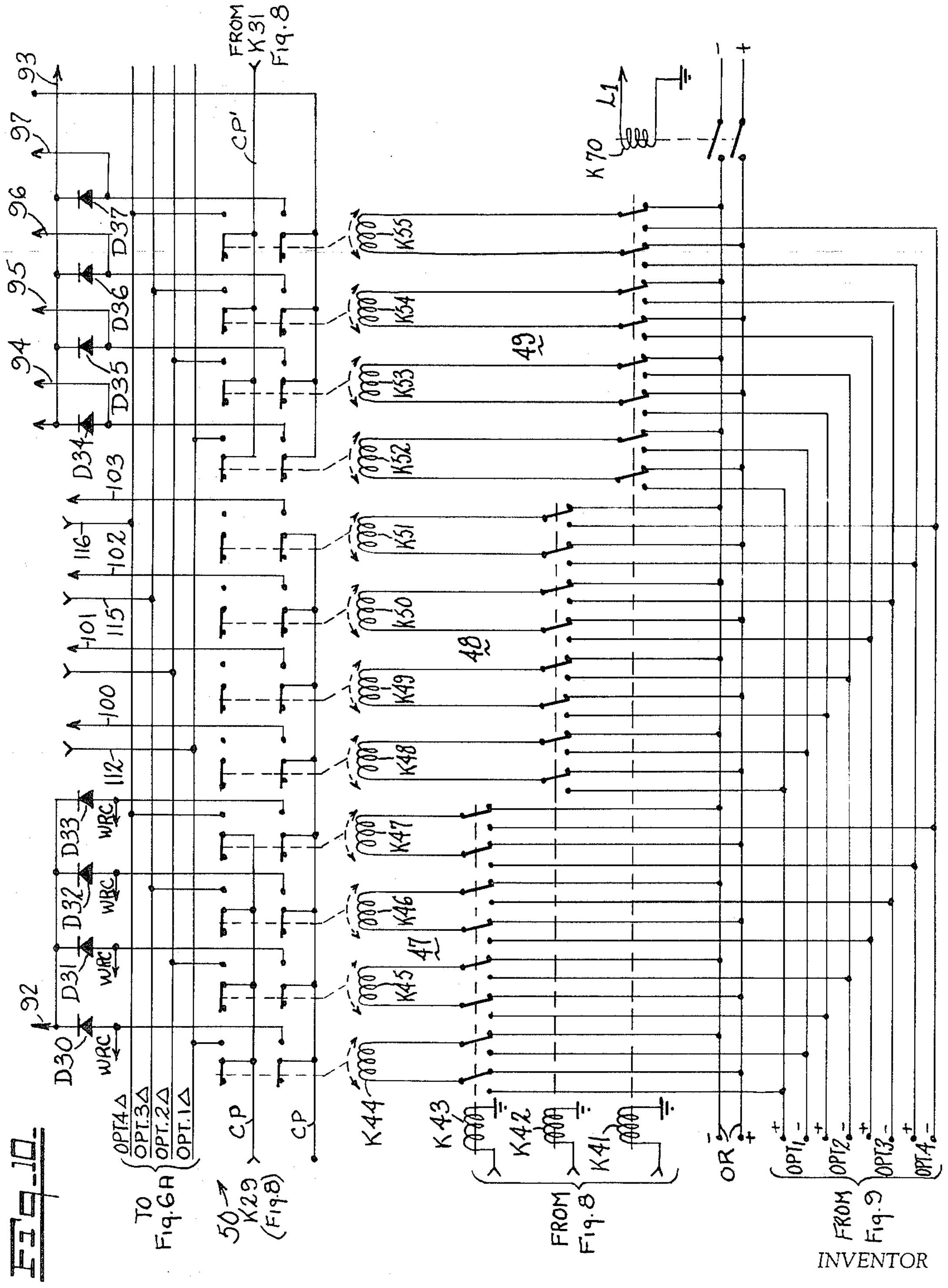
Figure 11:
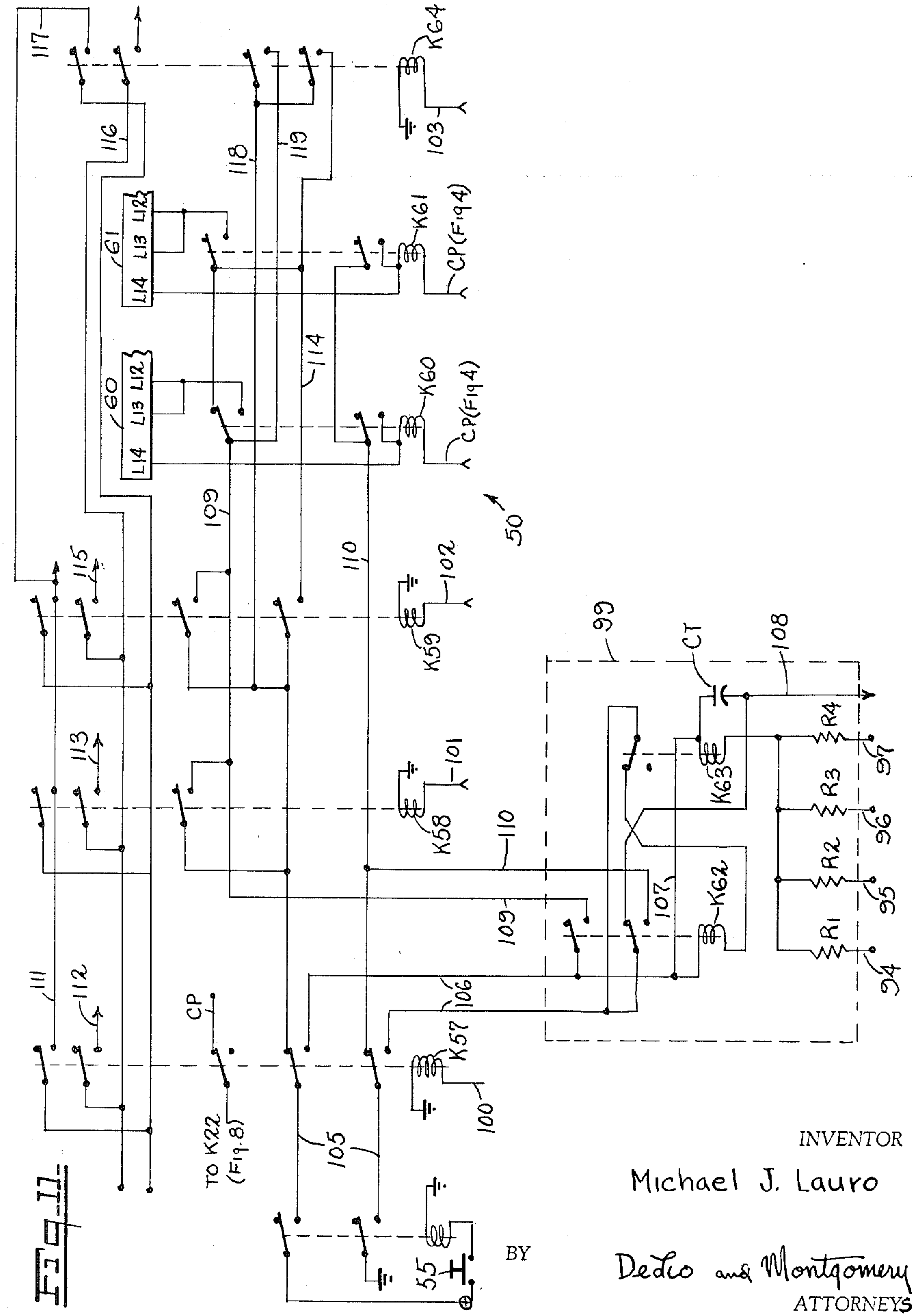
Figure 12:
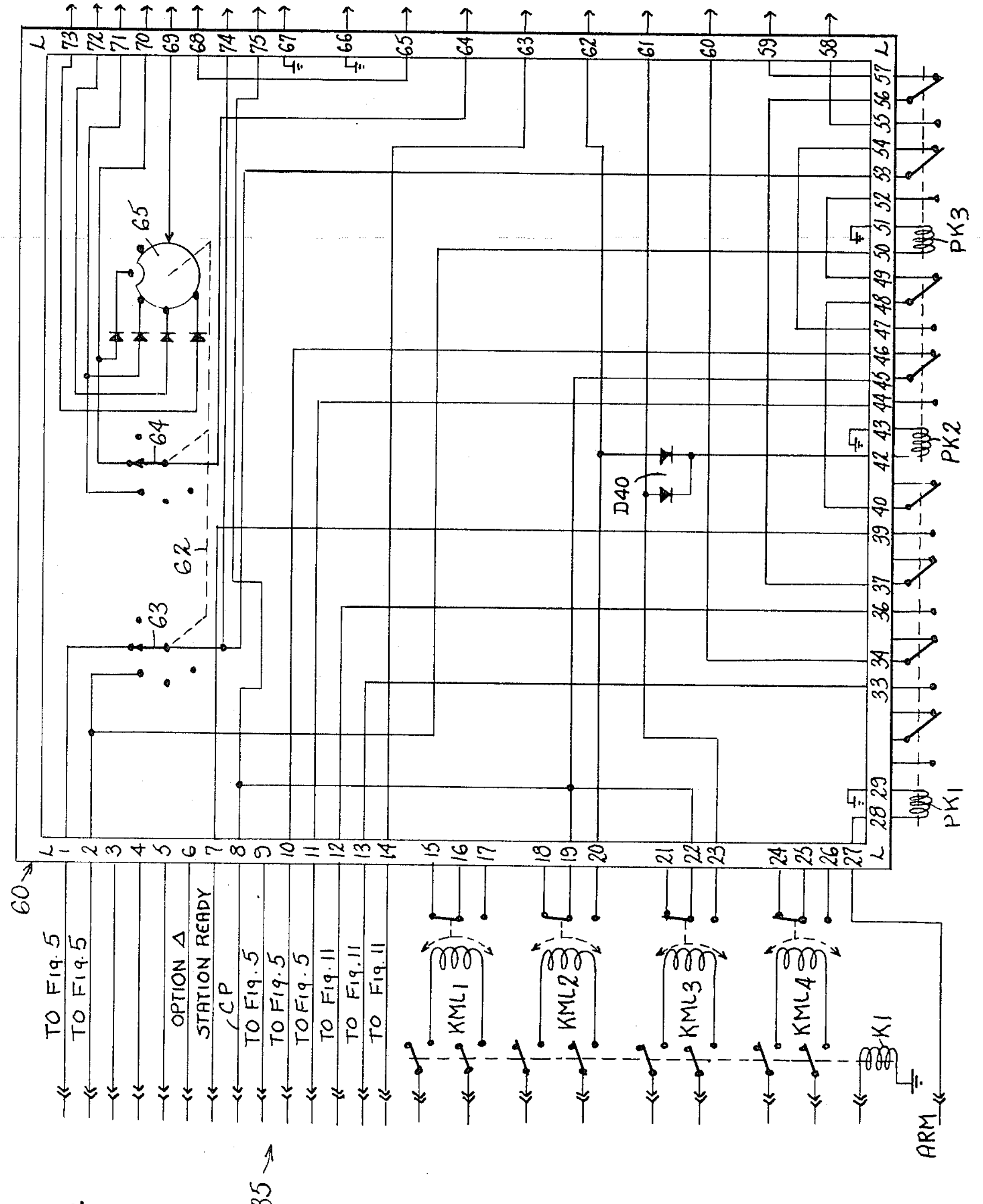
Figure 13:
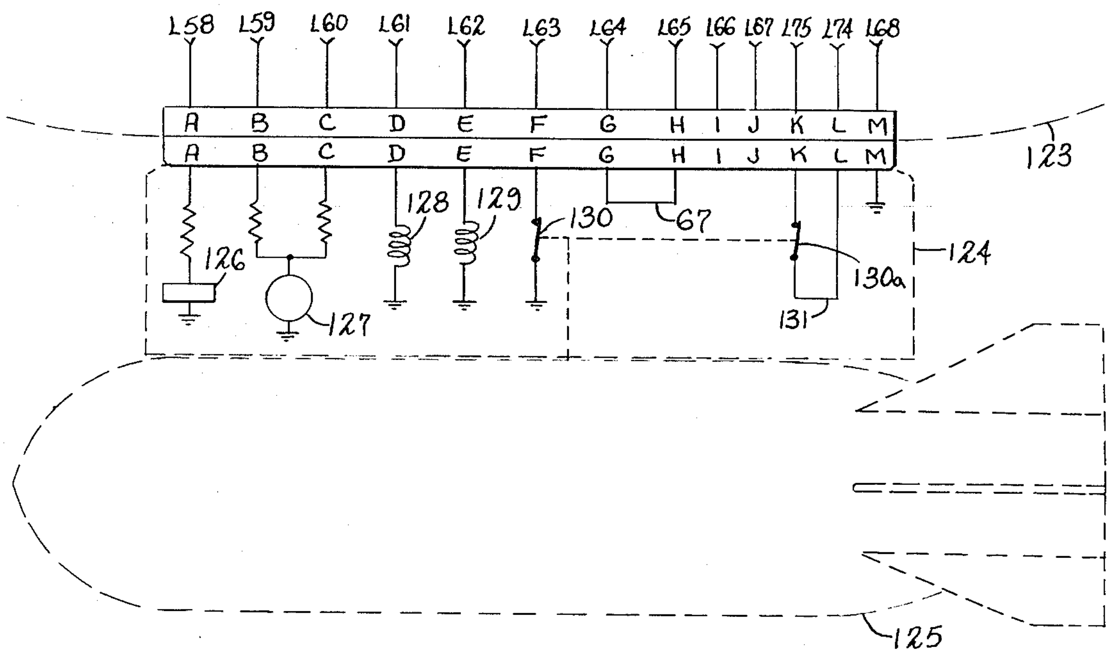
Figure 14:
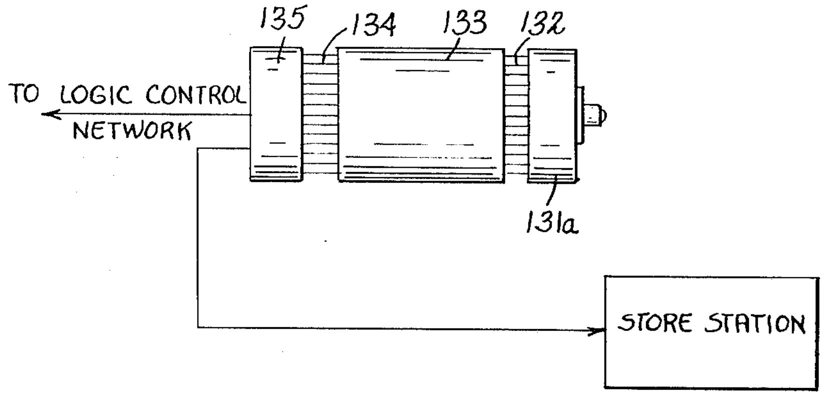
Figure 15:
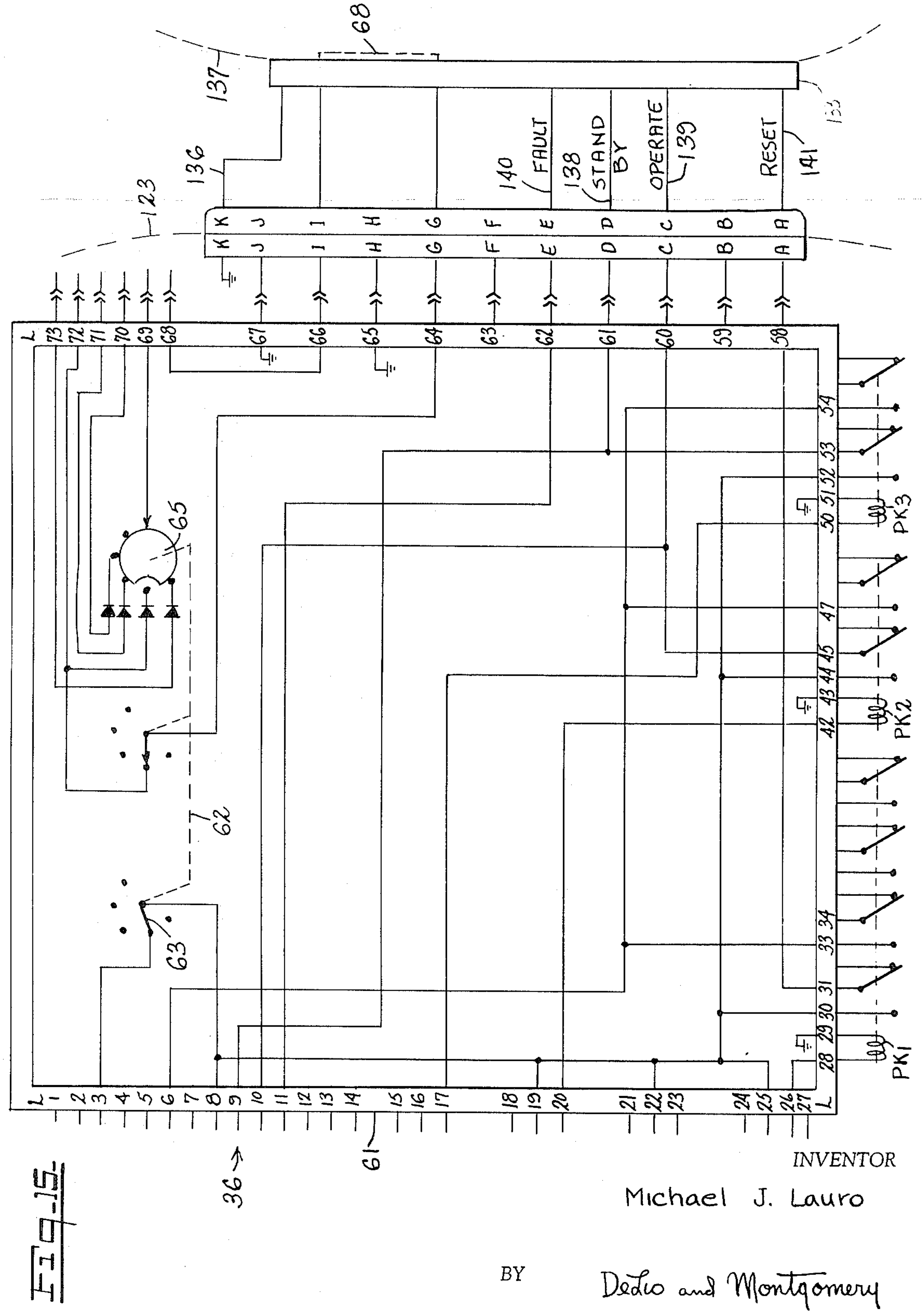
Figure 16:
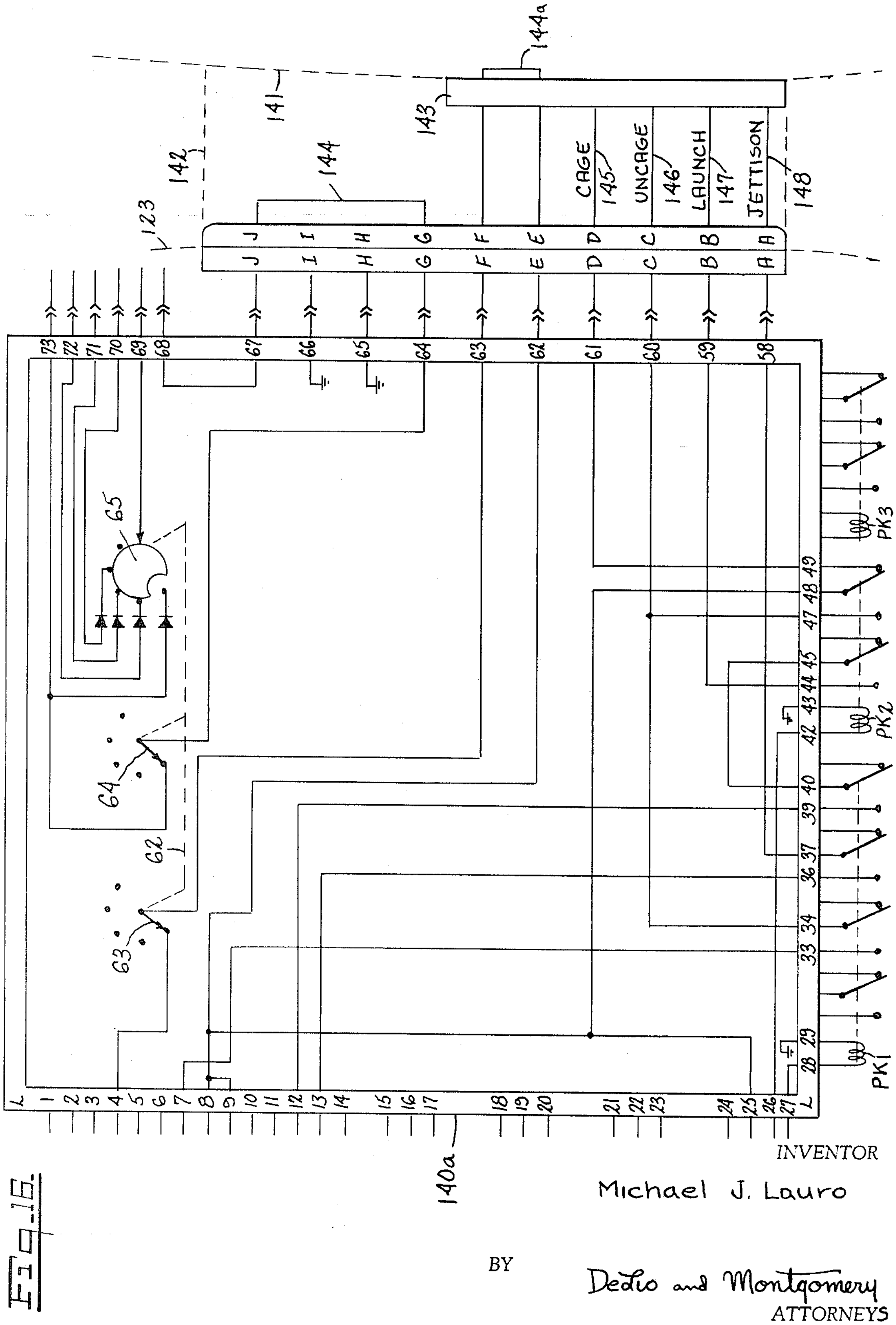
Figure 17:
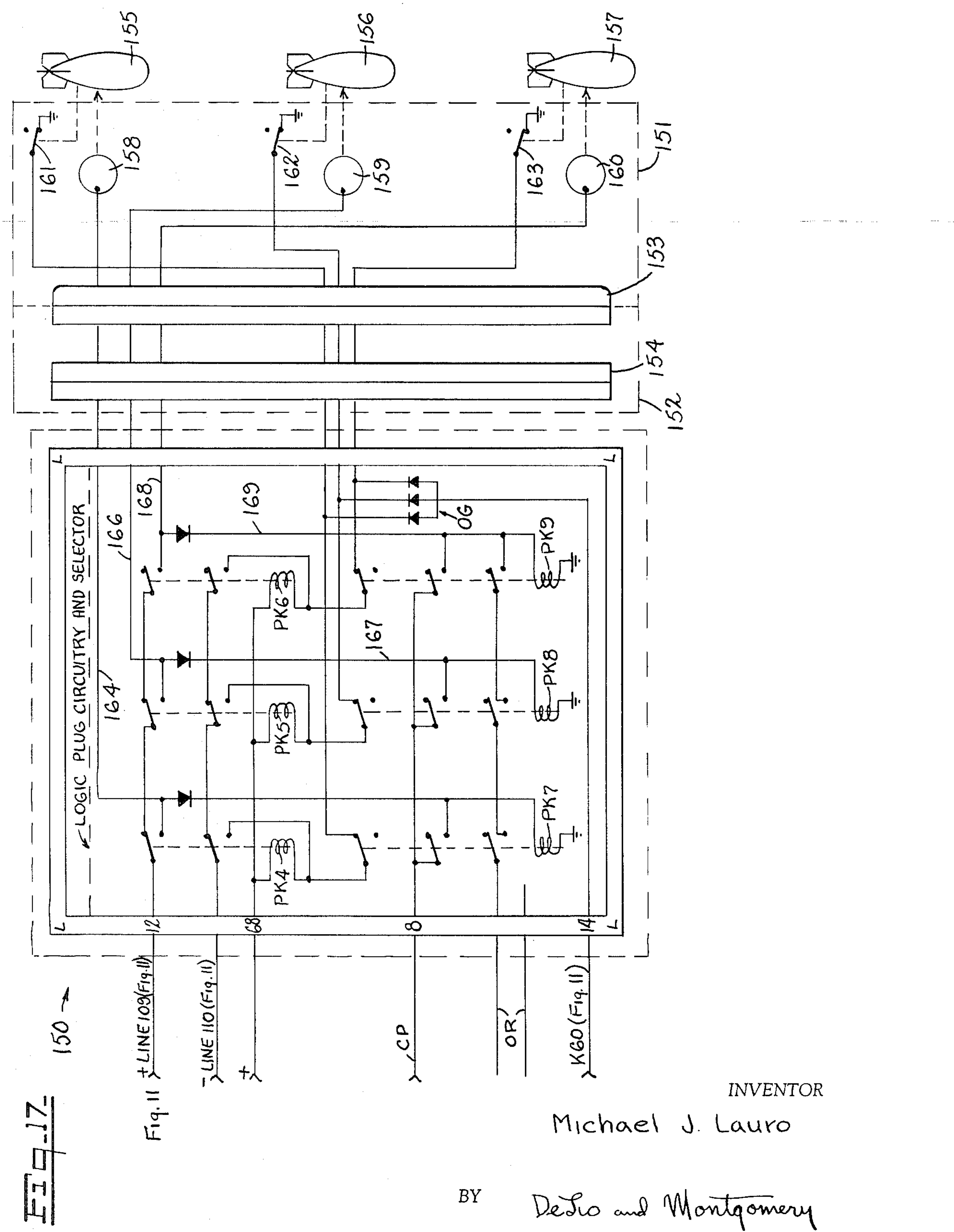

FIG. 10 is a schematic diagram of the delivery memory, off-load memory, rate memory and option control networks of FIG. 1;

FIG. 11 is a schematic diagram of the off-load release control network of FIG. 1;

FIG. 12 is a schematic diagram of the program control network of FIG. 1 further showing the relationship of the logic plug of FIG. 4 thereto;

FIG. 13 is a diagram, partly schematic and partly diagrammatic, of a store mounted to a store station and further showing the relation of FIG. 13 thereto;

FIG. 14 is a diagrammatic representation of the manner in which a system embodying the invention may be packaged;

FIGS. 15 and 16 are schematic diagrams of other program control networks illustrating further the manner in which the system is pre-programmed for a particular store type;

FIG. 17 is a schematic diagram of a program control network as shown in FIG. 1 adapted to carry to sequentially off-load a plurality of stores at one station.

An overall system embodying the invention is illustrated in block form in FIG. 1 and is generally indicated by the reference numeral 10. Monitor and management displays which convey intelligence to the observer or operator are provided on a panel 11 which comprises a monitor panel 12 and a management panel 13. A first row of display windows 14*a*, 14*b*, etc. display the type of store located at each store station. A second row of display windows 15*a*, 15*b*, etc. are arranged to display the condition of an associated store, such as "Preset", "Armed", etc. The stores are selected by selection means, such as store selector switches 16*a*, 16*b*, etc. actuated as by means of pushbuttons 17*a*, 17*b*, etc. To simplify illustration of the invention, only two store type displays and their monitoring displays are shown. However, it is to be understood that as many store type displays and monitors therefor may be included as are required. In the management portion 13 of panel 11 are a plurality of option displays, Option 1, Option 2, Option 3 and Option 4, each having a selection switch 18, 19, 20 and 21, each actuated as by means of a pushbutton 18*a*, 19*a*, 20*a*, 21*a*, respectively. The switches 18, 19, 20 and 21 are termed Option Selector Switches. Options 1, 2, 3 and 4 are shown on Option Display Windows. Panel portion 13 further includes mode selection switches 22, 23, 24 and 25 operated as by pushbuttons 22*a*, 23*a*, 24*a* and 25*a*. The switches 22 – 25 allow selection of various delivery modes, such as type of delivery, off-load mode, rate of delivery and store actuation. The mode selection buttons 22*a* – 25*a* are arranged to be lighted and indicate to the operator the mode that must be managed for each selected store.

Figure 2:
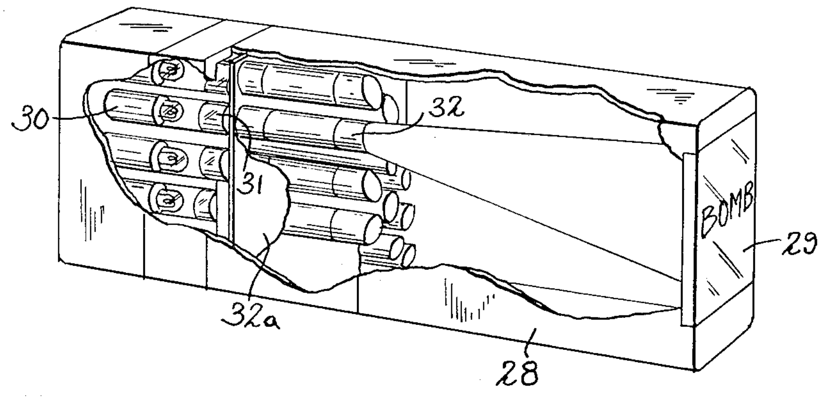

The individual displays preferably comprise a module including a plurality of light sources each associated with a particular display on a reticle disposed in front of the light sources so that upon energization of one light source it will display a particular word, character, number, etc., on the display window. A preferred module is shown in FIG. 2, and comprises a housing 28 having a viewing display window 29 which is seen on panel 11. At the rear of housing 28 are a plurality of selectably energizeable light sources 30, each having its own condensing lens 31 and projection lens 32 disposed on either side of a reticle 32*a*. Reticle 32*a* has a multiplicity of legends thereon, each adapted to be displayed on window 29 by one of the light sources. Each light source is individually energizeable through a lead connected thereto.

It is to be understood that other display devices, such as selectively positionable tapes, wheels, etc., may also be utilized for display purposes.

The monitor panel 12 depicts store station and control capability. Store station selection is accomplished by momentarily depressing the appropriate station selector pushbutton 17*a* 17*b* to select a store for actuation. Upon selection, an arrow 33 will appear in the associated station loading display window. This arrow will remain on, thus maintaining an indication of what station has been selected. It is possible to select other stations that are carrying compatible type stores. However, a programming means hereinafter described prevents the selection of other stations that are carrying incompatible store types.

This feature protects against inadvertent selection of stores that are incompatible to simultaneous release or management. This interlock is automatically removed when the selected store station or stations is depleted of stores, or when a store selection has been rejected.

The management panel 13 is provided for all functions of stores control. As illustrated, this assembly consists of a group of four multiple display readout indicators and four option select buttons. The unit is programmed to display a set of applicable options for each step of system control. The multiple display indicators are used to display option nomenclature. An option button is provided for option selection and is located directly below the display option nomenclature.

A plurality of mode control buttons, four as illustrated, are used to shift the operative function of the option display indicators and their respective selector buttons. These modes become operational only after station selection, and are responsive to the station selected to indicate, as hereinafter described, the applicable modes which must be managed for a selected store type. There is no restriction to the sequence of preparing a weapons system for use. Each mode can be selected, set or changed as required. After an option within a mode is selected the mode pushbutton indications will be extinguished leaving an indication of only those modes requiring further management. After all modes have been managed, the applicable station monitor display will indicate "Ready" in the case of releasable stores and descriptive nomenclature as may be predetermined.

When the delivery mode pushbutton is depressed, the option displays will display the applicable delivery options for the store type which has been selected. Upon choosing the delivery option, the delivery mode light goes out, and the operator then selects the next mode for management. Assuming the next mode is the off-load mode, the option display windows will then display the applicable off-loading options, such as "Ground Burst", "Air Burst", etc. for a bomb. Next, if applicable, the operator will manage the release rate mode by depressing the rate pushbutton which causes the option displays to display various rates of release, if applicable to the store type selected. In some cases, this will not be applicable, for example, if the store selected is an electronic countermeasure pod.

The store control mode of operation is utilized to prepare a weapon or store for use. A store control may include such items as arming and fusing, caging or uncaging a missile, etc. All store control options in each of the modes are correlated with the type of weapons selected. Only those options of control applicable to the weapons selected will be displayed. This feature provides safe, positive and rapid store control.

Within the applicable modes, when an option is selected an option entered arrow is produced in the selected option window. However, once selected, it may be rejected in one manner by merely pushing another option button to select a different option. As will hereinafter be explained, after a station has been completely set for operation by management of all the applicable modes and applicable options therein, all options can be readily redisplayed and rechecked by reselecting the applicable modes. The selection arrows will automatically point to the options that were previously selected for each mode of control.

To release or actuate a weapon for operation, various logical conditions must coincide. Listed below are exemplary logic conditions, all or less than all of which may be applicable to release or actuation of a particular weapon or actuation of a store.

1. Store Selected
2. Delivery Mode Option Selected
3. Off-Load Mode Option Selected
4. Rate Mode Option Selected
5. Store Control Option Selected
6. Firing Switch Closed.

Store selection is made by one of store selection switches 17*a*, 17*b*, etc. The delivery mode is selected by delivery mode switch 22. Off-load mode is selected by off-load mode switch 23. Store control or preparations, such as bomb fusing, is controlled by the store control mode switch 25. In the case of the off-load mode, sequencing may further be selected, if applicable, by rate mode switch 24. A master armament switch (hereinafter described) must be moved to the ON position before any stores actuation or off-loading may be accomplished.

Figure 3A:
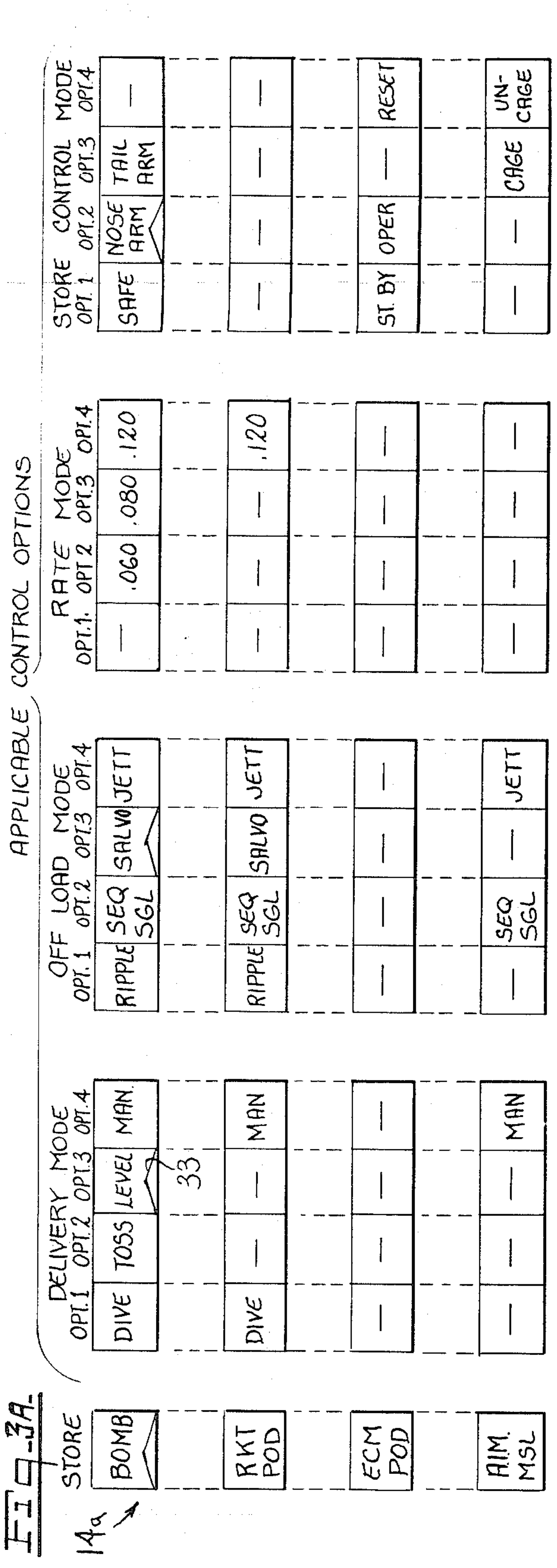
Figure 3B:
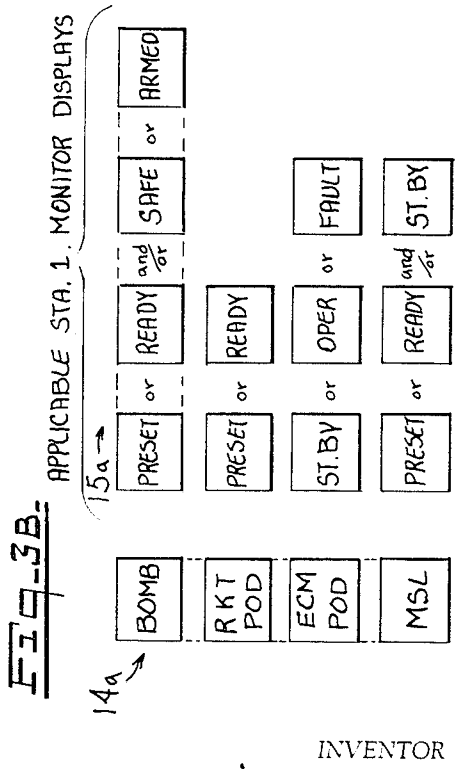
Figure 3C:
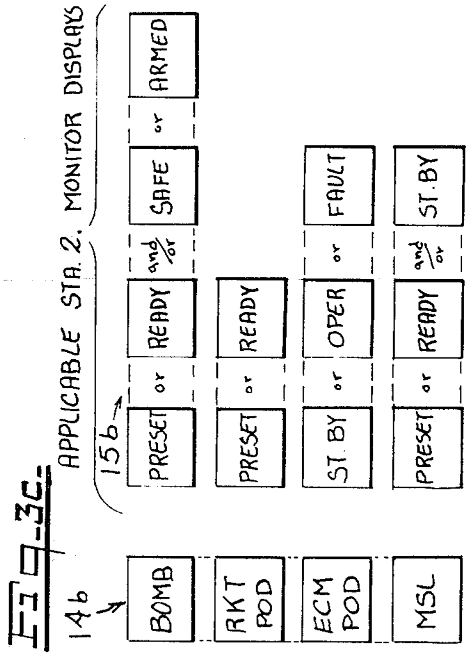

Reference is now made to FIGS. 3*a*, 3*b* and 3*c*. FIG. 3*a* exemplifies four different store types that may be displayed in one or more windows 14*a*, 14*b*, etc. Assuming that a bomb type store is actually at a store station, the existence of this weapon is dislayed on window 14*a*. In response to selection of this store by switch 16*a*, all mode lights light up to indicate what modes must be managed by the operator. When the operator closes delivery mode switch 18, the option display windows will display applicable options for this store and mode, Dive, Toss, Level and Manual (MAN). If when the operator selects a delivery option, such as Level, an option entered arrow 33 will appear in the Option 3 window and the delivery mode lamp will go out. The remaining lights then indicate what further modes must be managed. If the operator now selects the off-load mode by depressing pushbutton 19, the applicable options, Ripple, Sequence Single (SEQ.SGL), Salvo, and Jettison (JETT) will be displayed in the option windows. The operator then selects a desired option, such as Salvo, and the off-load mode light is extinguished. The operator then must manage the rate mode options in the same manner and select the desired rate. However, since "Salvo" delivery option has been selected, as hereinafter explained, the rate mode is not applicable and is disabled and not indicated as requiring management. The operator must then control the final step of store control to ready the bomb for use or to keep it in a Preset or Safe status. Assume the operator desires to arm the bomb at its nose, Option 2 in the store control mode is selected, the option entered arrow is entered and all mode lights are now extinguished indicating that all applicable management options have been managed.

This condition that the bomb store is ready for release is now sensed and a condition indicative thereof is applied to the display in monitor window 15*a* beneath 14*a* on monitor panel 12, and the legends "Armed" and "Ready" will appear in this window.

FIGS. 3*a* and 3*b* further show the options available in the various management modes should a Rocket Pod, Electronic Countermeasure (ECM) Pod or Air Intercept Missile (AIM-MSL) be at the store station. It will be noted that with some types of stores, one or more management modes may not be applicable. For example, with a particular type of rocket pod the operator need make no option selection in the store control mode. This is indicated to the operator by the fact that when he selects a rocket pod store, the store control mode pushbutton does not light up. In a similar manner, if the store is an ECM pod, only the store control mode must be managed by the operator. If the store were an air intercept missile, the rate mode would not be applicable which would be signified by no light in the rate mode pushbutton.

Reference is again made to FIG. 1. The vehicle to which the system is installed, as illustrated, includes two store stations 33 and 34, each adapted to receive one or more store types. Associated with each of store stations 33 and 34 are program control networks 35 and 36, respectively. Program control network 35 includes a store logic and type selector network 37 and a station program network 38. In a similar manner, program control network 33 includes a store logic and type selector network 39 and a station program network 40. All of the program control networks are connected in parallel with respect to a logic control network 41. Associated with each program control network 35 and 36 are store program networks 42 and 43, respectively. However, only store program network 42 and its relation to the remainder of the system and the display panels will be described in detail, it being understood that network 43 is of the same character as network 42. The store logic and type selectors 37 and 39 are logically correlated to the store station and include selection means for programming the logic circuitry in accordance with the on-board store at the respective store stations. Store program network 42 receives a signal from store logic and type selector network 37 which senses the type of store at station 33 and furnishes such signal to store type display 14*a* and store monitor display 15*a*. The store type display 14*a* is selected by actuation of switch 16*a*. A signal indicative of such selection is applied to store logic and type selector network 37 to indicate that the store at station 33 has been selected for actuation.

A store sensing network 44 in logic control network 41 receives inputs from each store logic and type selector network and in turn applies such intelligence to an option program network 45. Option program network 45 is also arranged to receive signals from each of option selector switches 18 – 21, indicative of a mode option which may be selected. The option selection is correlated with the store sensed by network 44 and also the applicable modes. As a result of such correlation, option program network 45 applies signals to option control network 46 which then commits the selected options to storage in delivery memory 47, off-load memory 48, rate memory 49, and also supplies a signal indicative of the store control mode to off-load release control 50. The mode control selection switches 22 – 25 each have an output connectable to mode selection network 52 indicative of mode selection management. A mode selection signal is applied by mode selection network 52 to each of delivery memory 47, off-load memory 48, rate memory 49 and off-load release control 50. The options selected by option selection switches 18 – 21 are monitored from memories 47, 48 and 49 by an option monitor network 53 which furnishes a signal to the option displays to illuminate an arrow in the selected option window.

The network of FIG. 1 further includes a weapons release computer 54 which is a standard item aboard many present-day weapons-carrying aircraft. When all management procedures have been satisfied and store actuation or release switch 55 is closed, an actuation signal will be supplied to off-load release control 50, either through weapons release computer 54 or directly through switch 56, depedding upon the setting thereof. Switch 56 is set in one of two positions to allow either direct actuation by the operator or computer actuation through computer 54, dependent on several parameters. The weapons release computer forms no part of the present invention per se, but is merely exemplified to show the manner in which it may be incorporated in the present stores management system.

When the stores have been prepared for actuation through the management sequence outlined above, and as more fully described hereinafter, an actuation signal to off-load release control will furnish an off-load or actuation signal to the applicable program control networks to cause selected store stations to off-load or otherwise actuate the stores thereat.

FIG. 4 illustrates in part a store logic and type selector networks 37 and 39 and exemplifies replaceable logic plugs 60 and 61 which are associated with each store type or a plurality of store types which may be accepted at a particular store station. For purposes of disclosure, it will be assumed that each of stations 33 and 34 may accept with or without suitable adaptors four different stores, bombs, rocket pods, ECM pods, or a particular type of missile(MSL). Each logic plug 60 or 61 includes a selector switch 62 having ganged switch arms 63 and 64 connectable to a plurality of contacts, and a ganged shorting disc 65. Each logic plug is provided with a plurality of terminal contacts, here illustrated as on a rectangular terminal connector. In practice, these contacts are interfaced with mating contacts on a unit including a station program network 38 and 40. Hereinafter all terminal points on the logic plug connectors and lines connected thereto are identified by the letter 'L' with a numeral annexed thereto. Each logic plug is programmed for a particular group of store types and, further, has selection means in the form of rotary switch 62 to select one of the store types of a group. Each logic plug further contains means for disabling selection and actuation of any store type loaded to associated store stations which are not the selected store type or compatible therewith.

Figure 5:
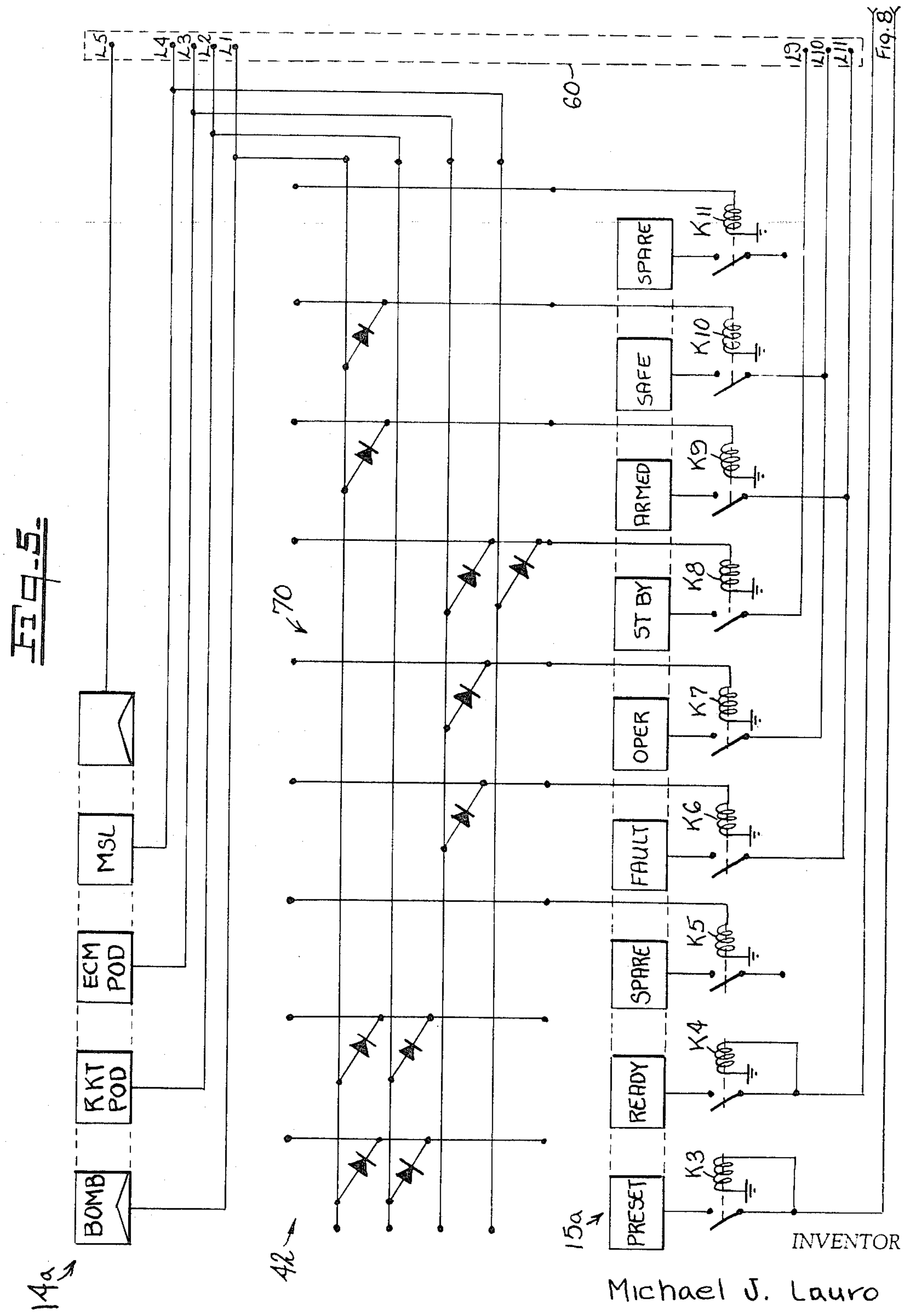
FIG. 5 is a schematic diagram of the store program network of FIG. 1 showing the manner in which this circuit senses the store at a store station and correlates the sensed store with the applicable store type displays.

In logic plug 60, a line L1 has been selected by arm 63 which, with reference to FIG. 5, indicates a bomb store is at store station 33. This same indication is given by the position of arm 64 with respect to line L70. When station 33 selector switch 16*a* is closed, relay K1 is energized to close its controlled contacts. This, through contacts K1*a*, puts power on line L5 to illuminate the arrow under the display "Bomb" in window 14*a* and, further, grounds through contact K1*b*, shorting disc 65. When contacts K1*c* and K1*d* close, positive voltage is connected to resistor 66 and further creates a circuit to relay coil K1 to switch on contact K1*c* which is returned to minus voltage. One side of relay coil K1 is further connected to line L68 and sensing loop 67 and through switch arm 64 to line L70 to place voltage on line L70. Line L70 is connected to a diode which is connected to a terminal resting in the cutout of shorting disc 65. Lines L71, L72 and L73 are connected directly to shorting disc 65 and, hence, to ground through contact K1b.

The purpose of this circuitry is to detect if a store which is incompatible to store station 33 has been mounted thereto, or if switch 62 has not been set to indicate the correctore store. For example, assume that the diode connected to line L70 was not open-ended, then a circuit would be completed to ground through contact K1*c* and all positive voltage from contact K1*d* and station selector switch 55 would be dropped across resistance 66. Relay coil K1 would not be energized and selection of the store at station 30 would be inhibited.

It will be noted that with logic plug 60, only a bomb or rocket pod may be selected by switch 65 having contacts connected to lines L70 and L71, respectively. Additionally, sensing loop 67 detects the compatibility of the store at station 30. Logic plug 60 serves a dual function in correlating the selected store with the actual store and, further, inhibits selection of a non-compatible store type to station 33.

It will now be apparent that if station 33 is selected, line L72 is grounded. This prevents simultaneous selection of station 34. The circuit of logic plug 61 is similar to that of logic plug 60 and will not be described in detail. However, when line L72 is grounded, relay K2 may not be energized inasmuch as arm 64 is at ground on line L72 and all voltage attempted to be applied to the coil of relay K2 is dropped across resistor 69.

Lines L70, L71, L72 and L73 lead to option program network 45, FIG. 6, to signal the selected store type. Lines L1, L2, L3, L4 and L5 from each logic plug lead to associated store program networks 42 and 43. Reference is now made to FIG. 5 which illustrates store program network 42. The option program network 45 is exemplified in FIGS. 6 and 6*a*.

In FIG. 5 there is shown store program network 42 in conjunction with displays 14*a* and 15*a*. Each of the displays 14*a* indicated as "Bomb", "Rocket Pod", "ECM Pod" or "MSL", indicate one of the separate light sources in a module, as does the arrow display. Each of these light sources is adapted to be energized over one of lines L1 – L5 from logic plug 60. Display 15*a* is illustrated as having nine potential displays as marked, although two are not programmed and held in reserve. A diode matrix 70 interconnects selected display lines with store monitoring lines, hereinafter described.

Assuming that a bomb is located at store station 33, line L1 is energized as previously described and the light source to display the legend Bomb in window 14*a* is illuminated. Also, energization of relay K1, FIG. 4, places power on line L5 as previously described and an arrow 5 is illuminated under Bomb indicating selection of the bomb store at station 33. The monitor display window 15*a* must have a module which will display the necessary applicable monitoring legends for the applicable monitoring displays which are programmed by matrix 70 to be Ready Safe and Armed. Additionally, if a rocket should be mounted at store station 35, it may be seen that the Preset and Ready monitor displays are already programmed therein. If an ECM pod is to be mounted at store station 35, the applicable monitor displays "Standby", "Operative" and "Fault" are programmed into the display module. Further, there may be spare windows provided for the possibility of new weapons systems which could be adapted to store station 30 and which would require additional monitoring displays. Therefore, the two displays marked "Spare" are available. By means of the diode matrix 70, a multiplicity of monitor displays may be utilized to monitor the status of any of four different store types which may be mounted to a particular store station. The arrow display connected to line L5 will show in display window 14*a* whenever that particular store station has been selected.

The particular and applicable conditions for each type of weapons store station 35 may be easily traced from lines L1, L2, L3 and L4 through diode matrix 70. Relays K3 – K11 inclusive, are energized upon occurrence of particular conditions or actions to terminate a store's management cycle and indicate on display 15*a* the status of the selected store, as will hereinafter be described. The network of FIG. 5 provides a means for displaying or indicating a store type and in part a means for indicating the status of such store type.

Each of the possible option displays of the option windows is connected through a diode matrix 71, FIG. 6, to selected ones of lines L70 – L73 from FIG. 4. It may be seen that when the delivery mode selection relay K12 is energized, windows 18 – 21 will be enabled to display as many as four options, dependent on which of lines L70 – L73 are energized. In a similar manner, when the off-load mode selector relay K13 is energized, as many as four options may be enabled, again dependent on which of lines L70 – L73 are energized.

Assuming that line L70 is energized as previously described, all illustrated mode options will be sequentially set forth in the delivery mode and the off-load mode. However, in the rate mode, the Option 1 display will show "No Choice". Similarly, in the store control mode only the "Safe", "Nose Arm" and "Tail Arm" options will be displayed. Each of the options are connected to an OR gate. All Option 1 displays are connected to a gate comprising diodes D1 – D5 Option 2 displays to diodes D6 – D10, Option 3 displays to diodes D11 –

D15 and Option 4 displays to diodes D16 – D20. Each diode OR gate must have an output to energize an associated one of relays K17, K18, K19 and K20. Thus, if the OR gate associated with each option selection does not have an output, that option cannot be selected since the associated one of relays K17 – K20 cannot close its controlled contact in circuit with the associated one of mode selection switches 18 – 21, FIG. *6a*. Relays K17 – K20 also act, when energized, to inhibit display of the No-option selection dashes in the display windows.

Option Program Network 45 as thus far described correlates the On Board stores with only the options in each mode applicable thereto.

A further matrix 72 signifies when there is no mode to be chosen. Line L72, which is energized when an ECM store is selected (logic plug 61, station 31), signifies through diodes D17, D18 and D19 that the delivery, off-load and rate modes are not applicable to this store. Similarly, Missile line L73 signifies through diodes D20 that the rate mode is not applicable to that store and rocket pod line L71 signifies that the store control mode is not applicable to that store. The matrix 72 thus supplies a signal to inhibit inapplicable mode selections, as will be described further hereinafter. Matrix 73 provides a function referred to as bracketing, hereinafter described.

Reference is now made to FIG. 7, which shows a system power control circuit 80. When system power switch SPS is closed to the STBY position, it supplies standby power for maintaining certain monitor displays. When closed to the control position CTR, relay K65 is energized, closing its controlled contacts to supply memory control power over lines MP and either station select lines SS or option mode reject lines OR, dependent upon the condition of relay K67, and also control power to line CP. The power control circuit 80 further includes a master reject switch REJ which, in one operative position, produces energization of relay K66 to supply power to slected mode reject lines SMR, and in the other operative position thereof, energizes relay K67. Relay K67, when energized, will remove control power from lines SS and apply it to option mode reject lines OR. Reject switch REJ acts as a means to cancel selected stations, and modes other than the store control mode.

Reference is now made in FIG. 8 which illustrates mode selection network 52. This network receives signals from the "No-choice" mode logic matrix 72 of FIG. *6a* over one or more of lines NC Del, NC DL, NC Rate, or NC Store. The No-choice mode signals are effective to energize associated ones of mode light control relays K21 – K24. The controlled contacts of these relays when energized will in turn connect corresponding ones of relays K21*a* – K22*a*, K23*a* and K24*a* to control power and cause energization of these relays which then close their control contacts in line MC. When all contacts in line MC are closed, the termination of a mode management cycle is indicated. Then power is applied through contacts K1 and/or K2 to monitor displays 15*a*, 15*b*, which display a store status dependent upon the setting of armament switch ARM. Switch arm ARM3 allows application of a mode management termination signal to the store stations.

When any of relays K21*a* – K24*a* are energized, control power is removed from the mode indicator lamps 18*a*, 19*a*, 20*a*, and 21*a*. Upon mode selection, the mode selector switch 22, 23, 24 and 25 are arranged to energize corresponding mode memory control relays K25, K26, K27 and K28.

When any of these relays are energized they move their contacts to close across memory power line MP to set memory relays K29, K30, K31 and K32. These relays when placed in a set condition close their control contacts to connect control power line CP to various points, as indicated. A reset circuit 80 associated with each of relays K25 – K28 is connected to not store option reject lines OR which when energized will reset all relays K29, K30, K31 and K32. Each of circuits 80 contain diodes D22 and D23, which provide a lock-out feature. Assume that mode switch 22 is closed, and relay K25 is energized, a positive voltage is applied to diode D23 from line MP and, hence, lines OR in a direction to reset all of the other memory relays of K30 – K32. The relays K29 – K32 are of the magnetic latching type and their contacts stay in the last position determined by the direction of energization of the relay coil.

It may be seen that the No-choice mode matrix of FIG. *6a* in conjunction with the network of FIG. 8 provides a means for indicating only the applicable modes requiring management. Additionally, only one mode may be managed at one time, the selected mode rejecting all other modes unless it is managed or itself rejected.

Assume now that a store has been selected and the delivery mode requires management. The operator will close switch 22 which will energize relay K25 whose contacts upon closing will place relay K29 across memory power lines MP. This sets relay K29 and control power is applied from lines CP through one of the K29 controlled contacts to relay K12, FIG. 6. When relay K12, FIG. 6, is energized, and its contacts closed, the option lines to diode matrix 71 are closed and the delivery mode options correlated with the store selected are displayed in the four option windows. The desired option in the delivery mode then may be selected through closing one of switches 18 – 21. This will result in relay K21 becoming energized, as hereinafter described, to extinguish lamp 18*a* and energize relay K21*a*. In a similar manner, mode selector switches 23, 24 and 25 may be closed to in turn energize off-load mode relay K13, rate mode relay K14 and store control mode relays K15 and K16, all in FIG. 6, to display the options correlated to the selected store type and allow selection of the option in each mode. If a delivery mode is chosen such that the rate mode is not applicable, the rate mode lamp will not be illuminated, as hereinafter described.

When all of the relays K21*a* – *K24a* have been energized and close their control contacts in line MC, and assuming that store station relay K1 or K2 has been closed, a Ready or Preset signal will be applied to lines L9 or L10, FIG. 5, and will be indicated in the store station 33 monitor display 15*a* through contact ARM1. The contact ARM2 leads to the store station 34 monitor display 15*b* and the ARM3 contact when in the upper position leads to the program control network for each store station. The line MC, together with the contacts therein, when closed, provide a means for indicating termination of a stores management cycle and indicating the status of the selected store.

Other contacts of relays K29 – K32 when closed apply control power to other networks as hereinafter described.

Reference is now made to FIG. 9 which schematically illustrates option control network 45 of FIG. 1. Input signals to this network are received over option lines OPT1 – OPT4 from option program network of FIG. 6a. Power on lines OPT1 – OPT4 control energization of relays K33 – K36. When each of option control relays K33–K36 are energized, they close their control contacts in an associated transmission circuit 90 and connect lines 91 thereof across the memory power lines MP. This, in turn, supplies memory power to option lines OT1, OT2, OT3 and OT4 which lead to delivery mode, off-load mode, and rate mode option memories K44 – K55, FIG. 10, hereinafter described. Each of circuits 90 further include diodes D25, D26, D27 and D28 which provide a means for selecting only one option unless a bracketing function, as hereinafter described, is utilized. Diodes D28 and D27 connected to mode reject line MR allow selected mode rejection if reject switch REJ, FIG. 7, is closed to energize relay K66. If reject switch REJ is actuated to energize line MR, the polarity of these lines will be opposite to the polarity placed on lines 91 by memory power lines MP, and this reversal of polarity will serve to reset any set memories K44 – K55 connected to lines OT1 – OT4, FIG. 10, as will hereinafter be described. Diodes D25 – D28 serve another function referred to as bracketing. Options displayed within a mode may be bracketed to allow a plurality of option selections within one mode. Such bracketing is determined by bracket matrix 77 of FIG. 6a, and the programming thereof. As an example, the four option displays could be programmed to be bracketed so that in Options 1 and 2, under store control, the legends Nose Arm and Tail Arm would be displayed, and in Option 3 and Option 4, the legends Air Burst and Ground Burst would be displayed. This could be accomplished by energizing relay K38 and opening line 92 so that the circuits 90 associated with Options 1 and 2 and the circuits 90 associated with options 3 and 4 would be isolated. This could be achieved by the provision of diode D29 in bracket matrix 76, FIG. 6a, connected to diode D29, line L70 and relay K38. Such diode connection upon application of power to line 70 energizes bracket relay K38 and brackets Options 1 and 2, and OPtions 3 and 4 by breaking line 92 between Options 2 and 3. When one of relays K33, K34, K35 or K36 is energized, and store mode option gate relay K40 is energized, power is applied over associated lines 91 to the program control networks 38 and 40. This transmission of power to program control networks 38 and 40 is under the control of store mode option gate relay K40. Relay K40 is energized when store mode memory relay K32, FIG. 8, is set. Relay K32 is set when the store control mode is selected by selector switch 25, FIG. 8. Thus, upon the occurrence of selection of the store control mode, the option selected therein is transferred directly to the selected program control network 38 and/or 40, and such store control options are not committed to one of the option memory units.

Reference is now made to FIG. 10 which schematically illustrates the memory networks 47, 48 and 49 and option monitor network 50. The memory units associated with delivery memory 47 comprise Option 1 relays K44 – K47 of the magnetic latching type which are settable S and resettable R in one of two stable conditions when energized. Option 2 relays K48 – K51 comprise a portion of off-load memory 48 and are of the same magnetic latching type. Option 3 relays K52 – K55 comprise a portion of the rate memory circuit 49. The relays K44 –K55 are adapted to be set by signals received over lines OT1 – OT4 from FIG. 9, dependent upon the option selected.

The delivery mode memories are further under the control of a delivery mode option gate relay K43. The off-load option memories are further under the control of off-load mode option gate relay K42, and the rate option memories are further under the control of rate mode option gate relay K41. Relays K41 – K43 are the non or not-store mode relays. Relay K41 is energized from the mode control network, FIG. 8, from control power line CP when rate mode memory relay K31 is set. Relay K42 is energized from line CP, FIG. 8, when off-load mode memory relay K30, FIG. 8, is set. Relay K43 is energized when the delivery mode memory relay K29, FIG. 8, is set.

Assuming that the delivery mode selection switch 22, FIG. 8, has been closed, it sets relay K29 and energizes relay K43, one of relays K44 – K47 may be set from one of lines OT1 – OT4 upon selection of the desired one of option switches 18 – 21 in FIG. 6a. Assume that Option 1 is selected, the OT1 lines will have memory power applied thereto and relay K44 will be set. Relay K44 will then close its contacts and connect control power line CP to diode D30. This will apply a signal over line 92 to relay K21, FIG. 8, to energize delivery mode light control relay K21. When relay K21 picks up it closes its controlled contact to energize relay K21a which closes its controlled contact in line MC and extinguishes delivery mode indication light 8a. In a similar manner, if Option 2, 3 or 4 selections are made within the delivery mode, relays K45, K46 and K47, respectively, will be reset and apply signals through respective ones of diodes D31 – D33 to relay K21, as heretofore described.

Additionally, when one of the options have been selected in the delivery mode as described, the set relay of relays K44 – K47 closes controlled contacts which connect control power lines CP from FIG. 8, when relay K29 is set, to option arrow lines which are returned to the option arrow displays in FIG. 6a over lines OPTΔ; OPT2Δ; OPT3Δ; and OPT4Δ to indicate which option has been selected. Additionally, the selected delivery option is signaled to weapon release computer by one of lines WRC.

The rate memory portion of FIG. 10 operates in the same manner and will not be described in detail except to state that the output of the OR gates comprising diodes D34, D35, D36 and D37 signifying that a rate option has been selected is applied by line 93 to relay K22, FIG. 8, to energize rate mode light control relay K23 and K23a and close the control contact in line MC and extinguish the rate mode option lamp 24a. The selected rate option is applied over one of lines 94 – 97 to a cyclic timer shown in FIG. 11.

The off-load control memory relays K48 – K50, upon closing corresponding contacts, cause application of a signal to off-load control network 50, hereinafter described in FIG. 11, which circuit will return a signal indicative of the appropriate option selection to one of lines OPT1Δ– OPT4Δ for transmission to the arrow displays in FIG. 6a. All of memory relays K44 – K55 may be reset by application of power to lines OR by relay off-load signal relay K70 which is normally energized when a store is loaded to a station, and de-energized as hereinafter explained, to close its contacts and energize lines OR when a store is off-loaded.

Reference is now made to FIG. 11 which exemplifies off-load control or release network 50. This circuit includes a cyclic timer 99 which is adapted to receive one of four inputs indicative of the selected rate options to resistors R1 – R4 over one of lines 94 – 97. The resistance R1 – R4, together with capacitor CT, comprise a cyclic timing circuit adapted to off-load stores at timed intervals. Network 50 further comprises a ripple option select relay K57 which receives power from line 100, FIG. 8; a sequence single (SEQ SGL) select relay K58 which receives power from line 101; a salvo select relay K59 which receives power from line 102; and a jettison select relay K59 which receives power from line 103. Station transfer relays K60 and K61 are energized upon selection of stations 33 and 34, and energization of relays K1 and K2, respectively. Timer relays K62 and K63 are energizeable when the Ripple option is selected in the off-load mode to enable timer 99.

Assume that the Ripple option has been selected in the off-load mode and rate Option 2 has been selected in the rate mode. Then relay K48, FIG. 10, is set and power is applied over line 100 to energize ripple select relay K57. When the operator depresses off-load switch 55, voltage is applied across lines 105 and lines 106. Relay K62, being returned to ground through the K63 contact, is energized immediately and connects lines 106 to lines 109 and 110. Capacitor CT charges positive over line 107 through line 108 at a rate determined primarily by resistance R2 until the voltage at the positive plate thereof reaches a value sufficient to energize relay K62. The K63 contacts open circuit relay K62 which opens its contacts and interrupts power to lines 109 and 110. When the charge on capacitor CT leaks off through resistor R2 relay K63 is de-energized, and this cycle repeats so long as switch 54 is closed. This applies repetitive pulses to lines 109 and 110 at a rate predetermined by resistor R2.

Relays K60 and K61 are connected to ground through terminals L14 on their respective logic plugs 60 and 61. Such ground will be maintained so long as the stores are not off-loaded, as hereinafter described. In the Ripple off-load option, one store will be off-loaded from each selected station with each rate pulse. The pulses are applied over lines 109 and 110 to terminal L12 of logic plug 60 while ground on line 110 holds relays K60 and K61 energized if terminal L14 is removed from ground, until all stores at station 33 have been off-loaded. Then when switch 55 is opened ground is removed from relay K60, and relay K60 cannot again be energized if all stores at station 33 have been off-loaded.

When ripple relay 57 is energized it closes it contacts in lines 111 and 112 to return an arrow display signal to line OPT1Δ, FIG. 10. Additionally, control power is applied over line 111 to off-load mode light control relay K23, FIG. 8, to extinguish lamp 23*a* and close the K23*a* contact in line MC.

If sequence single (SEQ SGL) Option 2 is selected, relay K58 is energized, upon setting of relay K49, through line 101. When relay K58 closes its controlled contacts an Option 2 entered signal is applied over line 113 back to line OPT2Δ, FIG. 10, to illuminate the arrow in the Option 2 window, FIG. 6*a*, and an option selected signal is applied over line 111 to relay K23. Additionally, a firing signal is applied over line 109 to the station logic plugs through the contacts of energized relays K60 and/or K61. Relays K60 and K61 are energized in accordance with the selection of store stations 33 and 34 for actuation. If stations 33 and 34 are carrying complementary weapons they may be selected from simultaneous operation and the firing signal would be applied to logic plugs 60 and 61 sequentially.

In this option relay K58 is energized each time switch 55 is closed and one store is alternately released from each station that has been selected. When a store is released from station 33 terminal L14 is released from ground as hereinafter described, but the coil of relay K60 is grounded through line 110 so long as switch 55 is closed. Then when switch 55 is opened K60 is released from ground and becomes de-energized and its contact in line 109 connects line 109 to terminal L12 on logic plug 61. Now, when switch 55 is again closed the store at station 34 will be released.

It will be understood that in the example just given for actuating two stations simultaneously, both stations would have been previously selected and managed together.

Salvo option relay K59 is energized upon receipt of an Option 3 signal over line 102, FIG. 10, indicating that Option 3 has been selected and relay K50 has been set. With this off-load mode option selected, all stations selected will release their stores simultaneously when switch 54 is closed. When salvo option relay K59 is energized its controlled contacts are closed and closing switch 55 will apply signals to terminals L13 of logic plugs 60 and 61 through lines 109 and 114. The relay contact K59 connected to line 111 returns a signal via line 110 to line OPT3Δ, FIG. 10, to enter an arrow on the display for Option 3, and also a signal is applied to relay K23 via line 115.

When Option 4, in the off-loading mode, is selected, the stores are to be jettisoned and relay jettison K64 is energized over line 103 which is connected to control power when relay K51, FIG. 10, is set. Relay K64 closes its controlled contacts and supplies an option-entered signal to line 116 which is returned to OPT4Δ line of FIG. 10 and, hence, to FIG. 6*a* to display an arrow in the Option 4 display window, and further sends a signal via lines 117 and 111 to relay K23, FIG. 8, to energize relay K23, extinguish mode light 20*a* and energize relay K23*a* to close its contact in line MC. The K64 contacts upon closing further connect line 118 to lines 119 and 114. Thus, upon depression of the release switch 54 a firing signal is applied to terminals L13 of logic plugs 60 and 61.

It may thus be seen that the off-load controlled network 50 is responsive to the managed modes and option selections therein, and further responsive to a release signal as may be derived from switch 55 or the weapons release computer 54 to predetermine the release or actuation of stores, the rate of release, and the quantity of release as the case may be.

The program control network 35 of FIG. 1 is schematically exemplified in FIG. 12 including both the station program network 38 and the complete store logic and type selector indicated in part as logic plug 60 in FIG. 4. The complete logic plug 60 is illustrated and, in essence, may be considered to store logic type selector 37. The station program network 38 comprises the remaining circuitry other than logic plug 60.

Considering now the logic plug 60, it will be recalled that the terminals L1 – L4 lead to the store program network 42 and the store display 14*a*, as shown in FIG. 5 and the terminals L9 – L11 lead to the monitor gate relays K3 – K11 of FIG. 5 to indicate at display 15*a* the status of the store displayed in display 14*a*. Line L12 as described in conjunction with FIG. 11 receives a firing signal. Terminal L14 furnishes a signal derived from terminal L63 that a store is on board and thus senses the existence of a store at station 33.

The relays KML1 – KML4 are store control option memories and a selected one is set by selection of options in the store controlled mode through closing one of switches 18*a* – 21*a*, FIG. 6*a*, which acts through option control network 46, FIG. 9. When store mode memory relay K40, FIG. 9, is energized, and the selected one of option control relays K33 – K36 is energized, memory power is supplied from lines MP over line 91 of the selected option to the selected station. In FIG. 12 the relays KML- – KML4 correspond to Options 1 – 4 of Safe, Nose Arm and Tail Arm with no selection at Option 4. The program control network further comprises a relay assembly including relays PK1, PK2, and PK3 with controlled contacts connected to terminals L28 – L57 of logic plug 60.

Reference is now made to FIG. 13 which illustrates store station 33 as a pylon and rack assembly 124 beneath the wing 123 of an aircraft and having a bomb type store mounted thereto. Within the pylon is a rocket firing plug 126, a store ejection cartridge 127, a nose arm solenoid 128, a tail arm solenoid 129, a store sense switch 130, and sensing loop 67 and connected to terminals A through H as shown. Store sense switches 130 and 130a ganged thereto is closed when the bomb store 125 is mounted to pylon 124. Switch 130*a* is included in a sensing loop 131 connected between terminals K and L.

Consider now FIGS. 12 and 13 in conjunction. It will be noted that the terminals A – H, K and L on the pylon assembly are connected to terminals L58 – L68 and L74, L75 on logic plugs 60. Further assume that the option to Nose Arm in the store control mode has been selected and relay KML2 is set, and armament switch ARM has been closed to energize relay PK1. Control power from terminal L8 is applied to terminal L22 and through KLM3 contact to L23, hence, through diode D40 to terminal L42 to energize relay PK2, which then closes its contacts. With the PK1 contacts picked up, terminal L12 is connected through terminals L36 and L37 to terminal L59 and to ejector cartridge 127 through pylon terminals D. Terminal L20 is connected to control power and terminal L19 and through terminal L62 and Nose Arm solenoid 129 in accordance with the selection option. Control power from terminal L23 is connected to L44 through L45, and returned to L11 which illuminates the Armed indication in window 15*a* to display the status of bomb store 125. Thus, the display 15*a* will show both Ready and Armed, one above the other. Thus, the bomb 125 is armed at the nose and firing line L12 is ready to actuate ejector cartridge 127. It will be noted that with logic plug 60 relay PK3, which is energized when a pocket store is loaded to pylon 124, is not energized. Now, when off-load switch 55 is closed, a signal is applied to line L12 as described in FIG. 11, to ejection cartridge 127 which discharges the bomb from pylon 124. At this time switch 130 in pylon 124 opens and removes the ground from terminals L63 and L14. Therefore, the ground is also removed from relay K60, FIG. 11, which is de-energized. Simultaneously, switch 130*a* opens and opens the connection from control power terminal L8. When this occurs, the store display and the monitor displays are extinguished. Also, ground is taken from the coil of store select relay K1, FIG. 4, which becomes de-energized.

If Option 3 in the store control mode has been selected the Tail Arm solenoid would have been energized with control power through terminals L20 to L23 and L61. Additionally, terminal 12, upon closing of off-load switch 54, would supply an off-load signal to ejector cartridge through terminals L36, L37, L56, L57 and L59.

FIG. 14 exemplifies the way a program control network as described might be packaged. A logic plug, such as logic plug 60, may be embodied in a housing 131 having a plurality of terminal members 132, L1 – L73, interfaced to a mating terminal panel on housing 133 which includes a program network for a particular store station. This housing 133 would further be interfaced by means of a plurality of connectors 134 to a housing 135 which might contain the power circuits shown in FIG. 7. Leads may then be taken to logic control network 41 and to the associated store station. An important feature of the invention is that the logic plugs may be removed and interchanged in association with each store station to therefore allow the program control networks 35 and 36 to be pre-programmed in accordance with the stores to be loaded to these stations. If the station is adapted to receive any of a group of store types, the logic plug for such group of stores may be set to the corresponding store by means of the selector switch 62 which appears on the face of the logic plug. All program control networks are then connected in parallel with respect to logic control network 41.

Examples of the interchangeability of the logic plugs in accordance with different types is further illustrated by reference to FIGS. 15 and 16.

Reference is now made to FIG. 15 which further illustrates logic plug 61 in program control network 40. The terminal connections L1 – L27 receive the same connections as shown in FIG. 12. The terminal connections L58 – L67 are connected to terminals A – J, respectively, at the station receptacle which connects in turn to mating terminals on an ECM pod 133 wing adaptor 136 having mounted thereto an ECM pod 137. When the countermeasure system is to be operated it will be seen by referral to FIG. 3 that the only mode to be controlled is the store control mode having three options therein. The monitor displays at window 15*a* applicable to this store are "Standby", "Operate" or "Fault". Assuming that the operator selects the standby option in the store control mode, store control memory KML1 will be set and control power will be applied to terminal L17 and terminal L50 to energize relay PK3 which will close its contacts and connect the Standby line at terminal L61 to terminals L53 and L52 and, hence, to control power line CP. Then, when the operator wishes to operate the counter-measure system he selects store control mode Option 2 which as hereinbefore described in conjunction with FIG. 9 rejects previously selected Option 1. Control power is then applied to terminals L19, L20 and L42 to energize relay PK3 which closes its contacts and control power is applied to the Operate line 139 in the wing adaptor through terminals L44 and L45. Both of these Options are monitored by connections to terminals L9 and L10 to show the status of the countermeasure system on display 15*a*, FIG. 5. If an overload should develop in the countermeasure system and throw a protective circuit breaker (not shown) such fault will be signified at terminal L62 by the Fault Line 140 and applied to Fault Line L11, which is displayed to the operator on window 15*a*. Upon indication of the fault, the operator may reset the countermeasure system by selecting Option 4 in the store control mode which energizes relay KLM4 and power supplied through terminals L25 and L26 to energize terminals L28 and relay PK1. When relay PK1 picks up its contact control power is applied to Reset line 141 through terminals L58 and terminals L31 and L30 to reset the circuit breaker.

The pod wing adaptor further contains the sensing loop 68 shown in FIG. 4, to sense the existence of the ECM store on board and apply a signal indicative thereof to line L72.

It will be noted that the program control network of FIGS. 12 and 15 are identical with the exception of the replaceable logic plugs 60 and 61. This exemplifies the versatility of a system embodying the invention, in that through the use of stores mounting adaptors, if necessary, essentially any weapons system or any type of store may be carried at any store station. Moreover, logic plugs, such as logic plug 60, may be so programmed as to be utilized with more than one type of store. Additionally, the system can be adapted to any future stores merely through interchange of the logic plugs. Various types of logic plugs may be carried in inventory and utilized in any monitoring and management system to accept any available stores, yet afford the operator a higher degree of control over the underboard stores while presenting a minimum of decisions to be made.

It is to be understood that while a system embodying the invention has been described with two store stations, in practice probably four or more store stations might be required to be monitored and managed. For example, in the F-105 aircraft, there would probably be two stores mounted to each wing plus a store in the fuselage of the aircraft. In such situation, the two inboard, wing stores would very likely be identical and the two outboard wing stores would very probably be identical. In such situation, the operator would manage the two outboard stores simultaneously and the two inboard stores simultaneously or, if all wing stores were identical, all could be managed simultaneously.

To further illustrate the versatility of the system to manage various types of stores, FIG. 16 illustrates a logic plug 140 together with a portion of an associated program control network, which may be utilized in the management of an air-intercept missile type store 141 mounted to a missile wing adaptor 142 having a missile electrical receptacle 143. The missile electrical receptacle 143 is adapted to receive four signals which as seen in FIG. 3*a*, are "Launch", "Jettison", "Cage" and "Uncage". It will further be seen that only three management modes are required. The wing adaptor 142 further includes an adaptor-sensing loop 144 connected across terminals L67 and L64 and a missile sensing loop 144a connected across terminals L62 and L63. The appropriate signals are conveyed to the missile electrical receptacle by a line 145, 146, 147 and 158. Logic plug 141 is illustrated as having only one operative position for the store type selector switch 62. It is to be understood, however, that this logic plug could be programmed for use with some other missile types. In view of the previous explanation of logic plugs 60 and 61, no detailed description is deemed to be required of logic plug 141, its operation is believed to be apparent from the foregoing disclosure and FIGS. 12 and 16.

FIG. 17 illustrates the manner in which a logic plug which may be programmed to provide signals in steps where similar multiple stores are located at each station, for example, a triple bomb ejector rack 151 mounted to pylon assembly 152 and having electrical connections to network 150 through suitable connectors 153 and 154.

Rack 151 is arranged to carry a plurality of bombs 155 – 157, each adapted to be off-loaded by ejector cartridges 158 – 160, respectively. The loading and off-loading of each bomb is sensed by store selector switches 161 – 163, each connected to one of the diodes of an OR gate 163 and, hence, to store sense terminal L14 on the logic plug.

Relays PK4, PK5 and PK6 are energized from station select terminal L68 when this station is selected. These relays are latched in by their own contacts to line 110. When an off-load signal is applied to terminal L12 (as by means of lines 109 and 110, FIG. 11) it is transmitted over line 164 to ejector cartridge 158 which off-loads bomb 155. At this time store sense switch 161 opens and removes ground from the coil of relay PK4. Also, ground is removed from line 110 as previously explained. This first firing signal is also applied over line 164 to energize relay PK7 which picks up its contacts and further open circuits the coil of relay PK4 to de-energize relay PK4. Relay PK7 is latched in by virtue of one of its contacts closing the circuits between line 165 and terminal L8. With relay PK4 now de-energized, the next off-load signal is applied over line 166 to ejector cartridge 159 which off-loads bomb 156. This opens store sense switch 162. The second firing signal is also applied over line 167 to energize relay PK8 which picks up its contacts and open circuits the coil of relay PK5. Upon termination of the second off-load signal line 110 is again removed from ground. Relay PK8 remains energized by virtue of the connection of line 167 to terminal L8 through a closed PK8 contact. A third off-loading signal is now applied over line 168 to ejector cartridge 160 which off-loads bomb 157 and opens store sense switch 163. This signal is also applied over line 169 to relay PK9 to produce energization thereof. When relay PK9 is energized it picks up its contacts and open circuits relay PK6. Also, line 110 is removed from ground upon termination of the third off-load signal.

Terminal L14 is now completely removed from ground by virtue of opening of all store sense switches 161, 162 and 163 which condition is sensed by one of relays K60 or K61 FIG. 11, or other similar relays for this station. It will be noted at this time that non-store mode reject lines OR are connected to ground through the closed contacts of relays PK7, PK8, PK9 to apply a store off-load signal to lines OR and reset all non-store memories.

It may be seen with referral to FIG. 11 that if an aircraft is carrying two triple ejector racks the operator may off-load bombs alternately from each rack in a rate controlled ripple delivery or may utilize the Single Sequence off-load mode to off-load a bomb from alternate stations each time he closes off-load switch 55.

An embodiment of the invention has been described in one form thereof with various modifications. In describing the invention, relay-actuated switches and magnetic memory devices shown in a de-energized or reset condition have been utilized to describe a system which achieves the objects of the invention. However, it will be apparent that the components utilized in the disclosed embodiment of the invention may be interchanged without departing from the scope of the invention. For example, the various mechanical switching elements may have electronic or solid state equivalents substituted therefor and the magnetic latching memory relays may have electronic or semi-conductor circuits such as flip-flops substituted therefor. Moreover, the circuit functions described herein may be achieved in other forms which would be a matter of choice and design within the scope of the invention.

From the foregoing, it is apparent that the objects of the invention set forth above, as well as those made apparent from the preceding description, are efficiently attained. While embodiments of the invention and modifications thereof have been set forth for purposes of disclosure, other embodiments may occur to those skilled in the art as well as modifications to the disclosed embodiment which do not depart from the spirit and scope of the invention. Accordingly, the appended claims are intended to cover all embodiments and modifications of the invention which do not depart from the spirit and scope of the invention.

What is claimed is:

1. A system for controlling actuation of a plurality of airborne ordnance devices located at a plurality of stations on an aircraft where each of the stations is adapted to mount at least one device type and each of the device types requires conditioning in at least one mode prior to actuation thereof and where there may be optional steps of actuation in each mode; comprising, sensing means in operative relationship with each station for sensing the existence of a predetermined device type thereat, a plurality of display means adapted to indicate device types, means responsive to said sensing means for causing said display means to indicate the type of device at each station, means for selecting a station for actuation of the device thereat, mode indicating means, means responsive to said sensing means and said selection means for causing said mode indicating means to indicate the operative modes of the device at the selected station which must be conditioned prior to actuation thereof, mode selection means, second display means, means responsive to selection of a mode for causing said second display means to display available options in each selected mode, option selection means, and means responsive to selection of all options in the indicated modes for actuating the device at the selected station.

2. The system of claim 1 wherein each of said sensing means includes disabling means effective upon selection of one station to inhibit simultaneous selection of another station having a device thereat whose actuation is incompatible to actuation of the device at the first selected station.

3. The system of claim 1 further including means responsive to selection of all options in the indicated modes for indicating the status of the device at each selected station.

4. The system of claim 3 further including means for storing the selected conditioning options.

5. The system of claim 1 wherein said sensing means are interchangeable in said system in accordance with the types of devices at the stations, at least one of said sensing means being programmed for use with a plurality of device types mounted to one of the stations.

6. The system of claim 1 wherein each of said sensing means includes means effective upon selection of its associated device to inhibit selection of a device at another station whose actuation is incompatible for simultaneous actuation with the device at the selected station.

7. The system of claim 3 further including means for bracketing said second display means for conditioning of a mode requiring a plurality of option selections.

8. The system of claim 1 wherein each of said sensing means is programmed to sense particular device types, and said sensing means are interchangeable in accordance with device types to be loaded to said stations.

9. In a system for controlling the operation of a plurality of diverse airborne ordnance devices mounted to aircraft stations where each device requires conditioning in at least one of a plurality of operative modes prior to actuation thereof and each of said devices is located at a predetermined station adapted to receive one or more device types, comprising means for sensing the existence of a device at the stations and identifying the device types, display means responsive to said sensing means for indicating the device types at each station, means for selecting at least one of the devices for conditioning prior to actuation thereof, means for indicating all operative modes of all devices, and means responsive to selection of said one of said devices for indicating only the conditioning modes required prior to actuation of the selected device.

10. A system for controlling actuation of airborne ordnance devices at a plurality of stations on an aircraft where each of said stations is adapted to accept at least one device type and each of said devices requires conditioning in at least one mode prior to actuation thereof; comprising correlatable sensing means in operative relation with each station for sensing and identifying a predetermined device thereat, a first plurality of display means, means responsive to said sensing means for causing said first display means to indicate the type of devices at each station, means for selecting one or more devices having compatible conditioning modes for actuation, means responsive to said selecting means for indicating only the applicable modes of the selected devices requiring conditioning, a second plurality of display means, means responsive to selection of each applicable conditioning mode for causing said second display means to display conditioning options in each mode, means for selecting a conditioning option in each indicated mode, and means responsive to conditioning of all required options of the indicated modes for actuating the selected devices.

11. The system of claim 10 further including a plurality of memory devices and means for setting the selected options in each applicable memory device.

12. The system of claim 11 further including means for rejecting selected stations.

13. The system of claim 12 further including means responsive to actuation or rejection of a selected station for resetting said memory devices.

14. A system for controlling actuation of independent airborne ordnance devices at a plurality of aircraft stations where each of said stations is adapted to accept one or more device types and each of said devices requires conditioning in one or more options in one or more modes prior to utilization thereof, comprising sensing means arranged in operative relation with each station for sensing the existence of a predetermined device thereat, means for selecting a station for actuation of a device thereat, a plurality of display means for indicating conditioning options of each device in each mode, means responsive to said sensing means for indicating applicable modes of conditioning required prior to actuation of a device at a selected station, and means responsive to said sensing means and selection of the applicable modes requiring conditioning to cause said display means to display only the options in each mode requiring conditioning.

15. A system for actuating a plurality of different airborne ordnance devices located at different aircraft stations and conditioned from a central control network for controlling logical conditioning of the stations, a programmed packaged circuit coupled to each station and coupled to said central control network, each of said packaged circuits including means for sensing at least one device type at its associated station and in response to such sensing programming said central control network in accordance with the sensed device type, means at said central control for selecting a station for actuation of the device thereat, each of said sensing means being responsive to selection of its associated station for inhibiting selection by said central control of another station having a device thereat with different conditioning requirements than the device at the selected station.

16. The system of claim 15 wherein each of said packaged circuits is interchangeable with said central control network in accordance with a device type to be carried at an associated station.

17. The system of claim 16 wherein at least one of said packaged circuits is effective to sense more than one device type and program said central control network therewith, said at least one of said packaged circuits having a device type selector means arranged to select a program for said central control means in accordance with the device type associated therewith.

18. The system of claim 15 further including a second programming network associated with each of the stations adapted to be coupled to one of said packaged circuits, said second programming networks being responsive to coupling to one of said packaged circuits for predetermining the conditions required for actuation of each of said devices.

19. A stores management system for controlling actuation of independent stores at a plurality of store stations where each of the store stations is adapted to accept one or more store types and each of the store types requires conditioning in one or more modes prior to actuation thereof and each of said modes may include one or more conditioning options, comprising sensing means in operative relationship with each station for sensing and identifying the existence of a predetermined store thereat, a plurality of display means, means responsive to said sensing means for causing said display means to indicate the type of stores at said stations, means for selecting a store for actuation, means responsive to said sensing means and said selection means for indicating the modes of the selected store requiring conditioning prior to actuation of the selected store, means for selecting indicated modes for conditioning option display means, means responsive to said mode selection means for causing said option display means to display the options in each required mode, option conditioning means, and means responsive to conditioning of the displayed options in each required mode for actuating the selected store.

* * * * *

PO-1050
(5/69)

UNITED STATES PATENT OFFICE
CERTIFICATE OF CORRECTION

Patent No. 3,779,129 Dated December 18, 1973

Inventor(s) Michael J. Lauro

It is certified that error appears in the above-identified patent and that said Letters Patent are hereby corrected as shown below:

Column 1, line 15, "device" should read -- devices --.
Column 4, line 24, after "FIG." change "13" to -- 12 --.
Column 4, line 33, after "carry" change "to" to -- and --.
Column 5, line 23, after "17a" insert -- or --.
Column 6, line 61, after "switch" change "18" to -- 22 --.
Column 7, line 2, after "pushbutton" change "19" to --23 --.
Column 7, line 49, after "network" change "33" to -- 36 --.
Column 8, line 37, "depedding" should read -- depending --.
Column 8, line 39, "computer" should read "computed".
Column 9, line 34, "correctore" should read -- correct --.
Column 10, line 15, after "arrow" delete "5".
Column 10, line 66, after "D5" insert -- , --.
Column 11, line 21, "odes" should read -- ode --.
Column 11, line 37, "CP" should read -- CR --.
Column 11, line 60, after "contacts" insert -- of relays --.
Column 12, line 1, "switch" should read -- switches --.
Column 12, line 9, after "circuit" change "80" to -- 80a --.
Column 13, line 11, after "option lines" change "OT1, OT2, OT3 and OT4" to -- OPT1, OPT2, OPT3 and OPT4 --.
Column 13, line 24, change "OT1 - OT4" to -- OPT1 - OPT4 --.
Column 13, line 29, change "77" to -- 73 --.
Column 13, line 40, change "76" to -- 73 --.
Column 13, line 44, change "92" to -- 90 --

PO-1050
(5/69)

UNITED STATES PATENT OFFICE
CERTIFICATE OF CORRECTION

Patent No. 3,779,129 Dated December 18, 1973

Inventor(s) Michael J. Lauro

It is certified that error appears in the above-identified patent and that said Letters Patent are hereby corrected as shown below:

Column 14, line 3, after "lines" change "OT1 - OT4" to -- OPT1 - OPT4 --.
Column 14, line 21, after "lines" change "OT1 - OT4" to -- OPT1 - OPT4 --.
Column 14, line 23, change "OT1" to -- OPT1 --
Column 14, line 31, after "light" change "8a" to -- 22a --
Column 14, line 43, after "lines" change "OPTΔ" to -- OPT1Δ --.
Column 14, line 47, "weapon" should read -- weapons --
Column 14, line 59, change "K50" to -- K51 --
Column 15, line 15, change "K59" to -- K64 --
Column 15, line 22, after "Option" change "2" to -- 1 --
Column 15, line 54, change "57" to -- K57 --
Column 15, line 54, change "it" to -- its --
Column 16, line 33, change "110" to -- 115 --
Column 16, line 35, change "115" to -- 111 --
Column 16, line 45, change "20a" to -- 24a --
Column 17, line 12, change "18a - 21a" to -- 18 - 21 --
Column 17, line 13, change "46" to -- 45 --
Column 17, line 18, change "KML-" to -- KML1 --
Column 17, line 44, change "diode" to -- diodes --
Column 17, line 53, change "L23" to -- L22 --
Column 17, line 60, change "pocket" to -- rocket --
Column 18, line 11, change "54" to -- 55 --

PO-1050
(5/69)

UNITED STATES PATENT OFFICE
CERTIFICATE OF CORRECTION

Patent No. 3,779,129 Dated December 18, 1973

Inventor(s) Michael J. Lauro

It is certified that error appears in the above-identified patent and that said Letters Patent are hereby corrected as shown below:

Column 18, line 17, change "131" to -- 131a --.
Column 18, line 64, change "PK3" to -- PK2 --
Column 19, line 9, change "KLM4" to -- KML4 --
Column 19, line 16, change "68" to -- 67 --
Column 19, line 51, change "140" to -- 140a --
Column 19, line 56, delete "as"
Column 19, line 57, delete "seen in FIG. 3a"
Column 19, line 65, change "141" to -- 140a --
Column 20, line 4, change "141" to -- 140a --
Column 20, line 19, change "163" to -- OG --
Column 20, line 35, change "165" to -- 164 --

Signed and sealed this 16th day of July 1974.

(SEAL)
Attest:

McCOY M. GIBSON, JR.
Attesting Officer

C. MARSHALL DANN
Commissioner of Patents